United States Patent
Manula et al.

(10) Patent No.: US 7,907,624 B2
(45) Date of Patent: Mar. 15, 2011

(54) SWITCH MATRIX

(75) Inventors: Brian Manula, Oslo (NO); Ola Torudbakken, Oslo (NO); Hans Olaf Rygh, Oslo (NO)

(73) Assignee: Oracle America, Inc., Redwood Shores, CA (US)

( * ) Notice: Subject to any disclaimer, the term of this patent is extended or adjusted under 35 U.S.C. 154(b) by 119 days.

(21) Appl. No.: 12/133,034

(22) Filed: Jun. 4, 2008

(65) Prior Publication Data

US 2008/0317025 A1 Dec. 25, 2008

Related U.S. Application Data

(60) Provisional application No. 60/945,778, filed on Jun. 22, 2007.

(51) Int. Cl.
*H04L 12/28* (2006.01)
(52) U.S. Cl. ...................................... 370/412
(58) Field of Classification Search ........................ None
See application file for complete search history.

(56) References Cited

U.S. PATENT DOCUMENTS

| | | | |
|---|---|---|---|
| 6,671,258 B1* | 12/2003 | Bonneau | 370/235 |
| 6,721,311 B1 | 4/2004 | Samsudin | |
| 6,985,484 B1* | 1/2006 | Miller et al. | 370/392 |
| 7,127,534 B2* | 10/2006 | Jackson et al. | 710/52 |
| 7,133,940 B2* | 11/2006 | Blightman et al. | 710/22 |
| 2003/0217221 A1* | 11/2003 | Naffziger et al. | 710/316 |
| 2004/0120338 A1* | 6/2004 | Cheung et al. | 370/419 |
| 2005/0089054 A1 | 4/2005 | Ciancaglini | |
| 2007/0121499 A1 | 5/2007 | Pal | |
| 2007/0140260 A1* | 6/2007 | Duxbury et al. | 370/395.41 |
| 2007/0153803 A1* | 7/2007 | Lakshmanamurthy et al. | 370/395.43 |
| 2007/0248086 A1* | 10/2007 | Petersen | 370/389 |
| 2008/0183907 A1* | 7/2008 | Thudt | 710/11 |
| 2008/0267182 A1* | 10/2008 | Smiljanic | 370/390 |
| 2009/0129313 A1 | 5/2009 | Tamura | |

FOREIGN PATENT DOCUMENTS

WO 03085909 A1 10/2003

* cited by examiner

*Primary Examiner* — Chirag G Shah
*Assistant Examiner* — Amarnauth Persaud
(74) *Attorney, Agent, or Firm* — Park, Vaughan, Fleming & Dowler LLP

(57) ABSTRACT

A switch system comprises a switch matrix providing a configurable, protocol agnostic, packet switching core, the switch matrix providing a non-blocking switch connecting a configurable number of ports together.

20 Claims, 37 Drawing Sheets

FIG. 1

SWITCH MATRIX

This application hereby claims priority under 35 U.S.C. §119 to U.S. Provisional Patent Application No. 60/945,778, filed on 22 Jun. 2007, entitled "COMMUNICATION SYSTEMS". The present application hereby incorporates by reference the above-referenced provisional patent application.

BACKGROUND

The invention relates to a switch system for connecting a configurable number of ports together.

A switch has a number of resources, such as ports, buffers and internal busses. These resources will often depend on each other (e.g., the usage of some resources typically requires the availability of others). At a certain time, a buffer at each input port typically holds packets to several destinations, while packets to a certain destination are held in different input buffers. If an input buffer has a single read port, and this read port is busy feeding data to one output port, another output port might have to wait idle until the read port of the input buffer becomes available.

Different switch implementations can use different protocols (e.g., PCI Express, Ethernet, InfiniBand, etc.). It is desirable to manage packet transfers such that it is possible to transfer the highest number of packets at the same time irrespective of the protocol being used.

The present invention seeks to provide an adaptable switch system that is configurable to different protocols.

SUMMARY

An embodiment of the invention can provide a switch matrix with a configurable, protocol agnostic, packet switching core, the switch matrix providing a non-blocking switch connecting a configurable number of ports together.

An embodiment of the invention can provide a switch system for connecting a configurable number of ports together, the switch comprising a plurality of switch matrix units and a switch interconnect interconnecting the switch matrix units, at least one said switch matrix unit providing a port connection to a port and providing a plurality of virtual output queues for respective destination ports, each virtual output queue being configured to buffer received packets to be transmitted to a respective destination port.

An embodiment of the invention can provide a method of operation a switch system for connecting a configurable number of ports together, the method comprising: providing a plurality of switch matrix units and a switch interconnect interconnecting the switch matrix units; providing port connections to the ports via respective switch matrix units; and buffering packets from the ports to be transmitted to destination ports in respective virtual output queues in the switch matrix unit, each virtual output queue being configured to buffer received packets to be transmitted to a respective destination port.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying Figures in which:

FIG. 1 is a schematic representation of the rear of an example switch chassis;

DETAILED DESCRIPTION

An example embodiment of a 3456-port InfiniBand 4× DDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports (n*n/2*n/2) edge points, using (5*n/2*n/2) switch elements with a total of (3*n*n/2*n/2) connections. The ratio of total to external connections is 5:1, i.e. 80% of all connections can be kept internal. The switch elements (switch chips) in the described example can be implemented using a device with 24 4×DDR ports.

An example switch uses a connector that support 3 4× ports per connector, which can further to minimize a number of cables. This can provides a further 3:1 reduction in the number of cables. In a described example, only 1152 cables (1/3*n*n/2*n/2) are required.

In contrast if prior commercially available 288-port switches and 24-port switches were used to create a 3456-port fabric a total of 6912 cables (2*n*n/2*n/2) would be required.

The example switch can provide a single chassis that can implement a 5-stage CLOS fabric with 3456 4×DDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the example embodiment, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
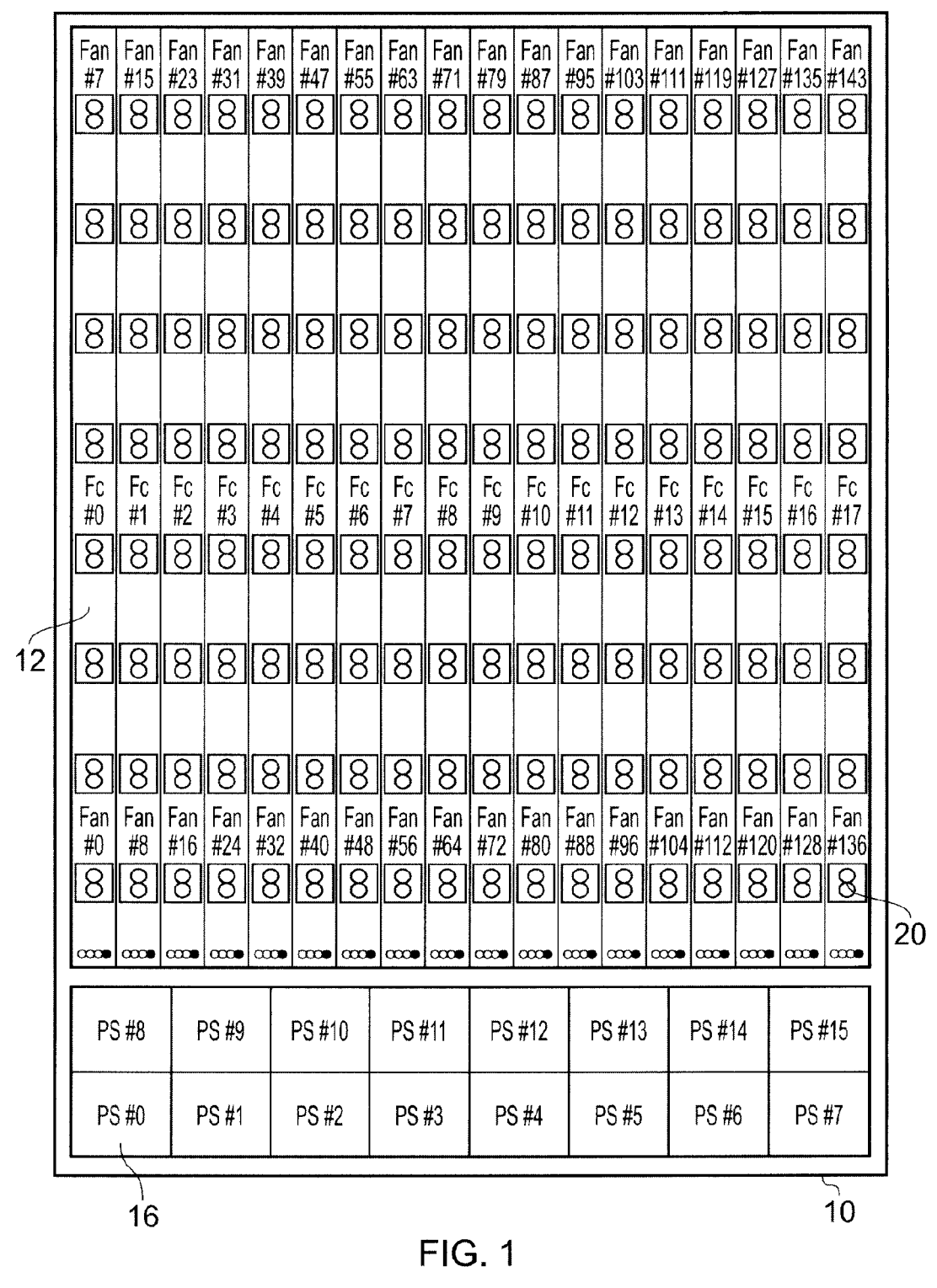
Figure 2:
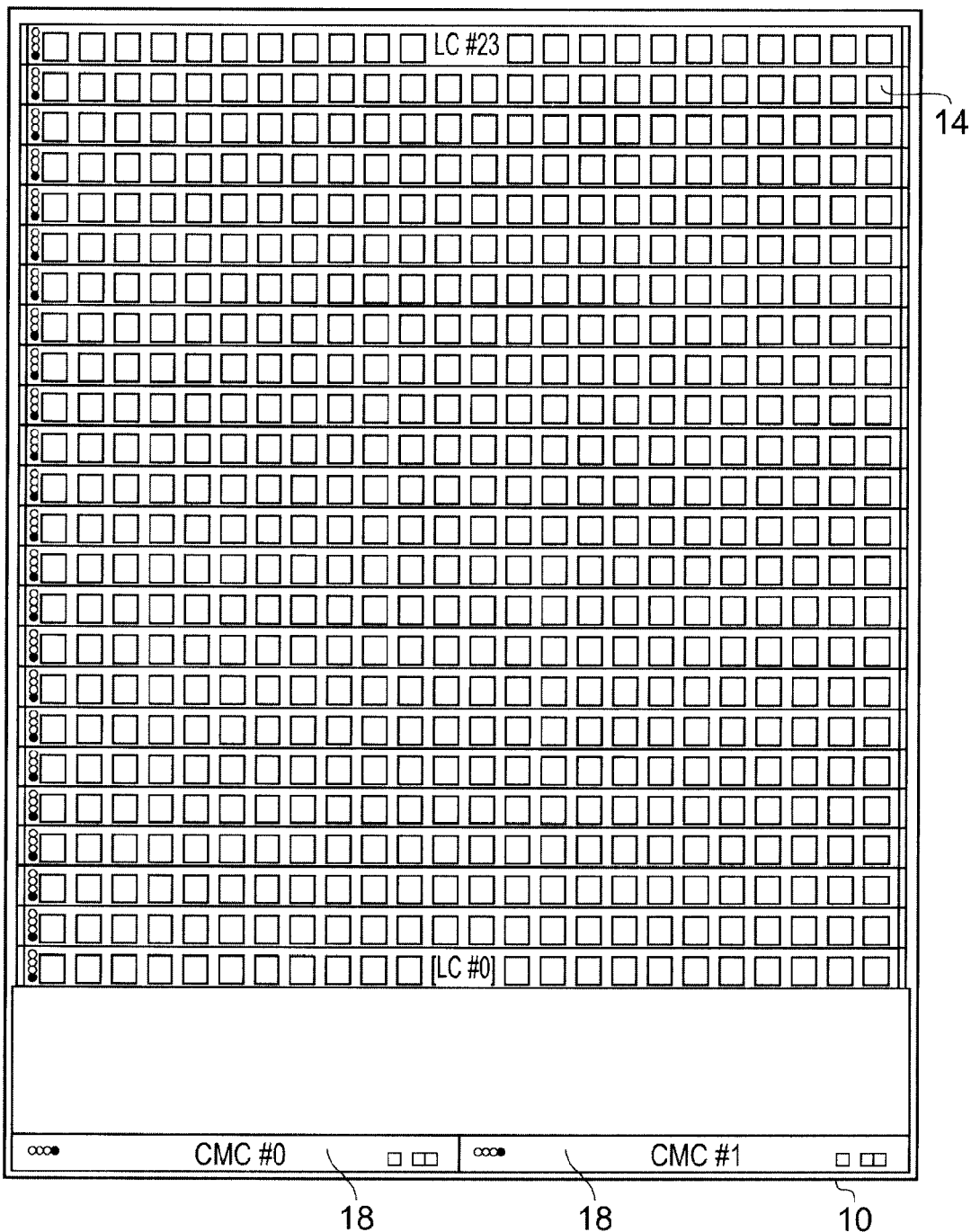
FIG. 2 is a schematic representation of the front of the example switch chassis.

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The example embodiment provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4× ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow is controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
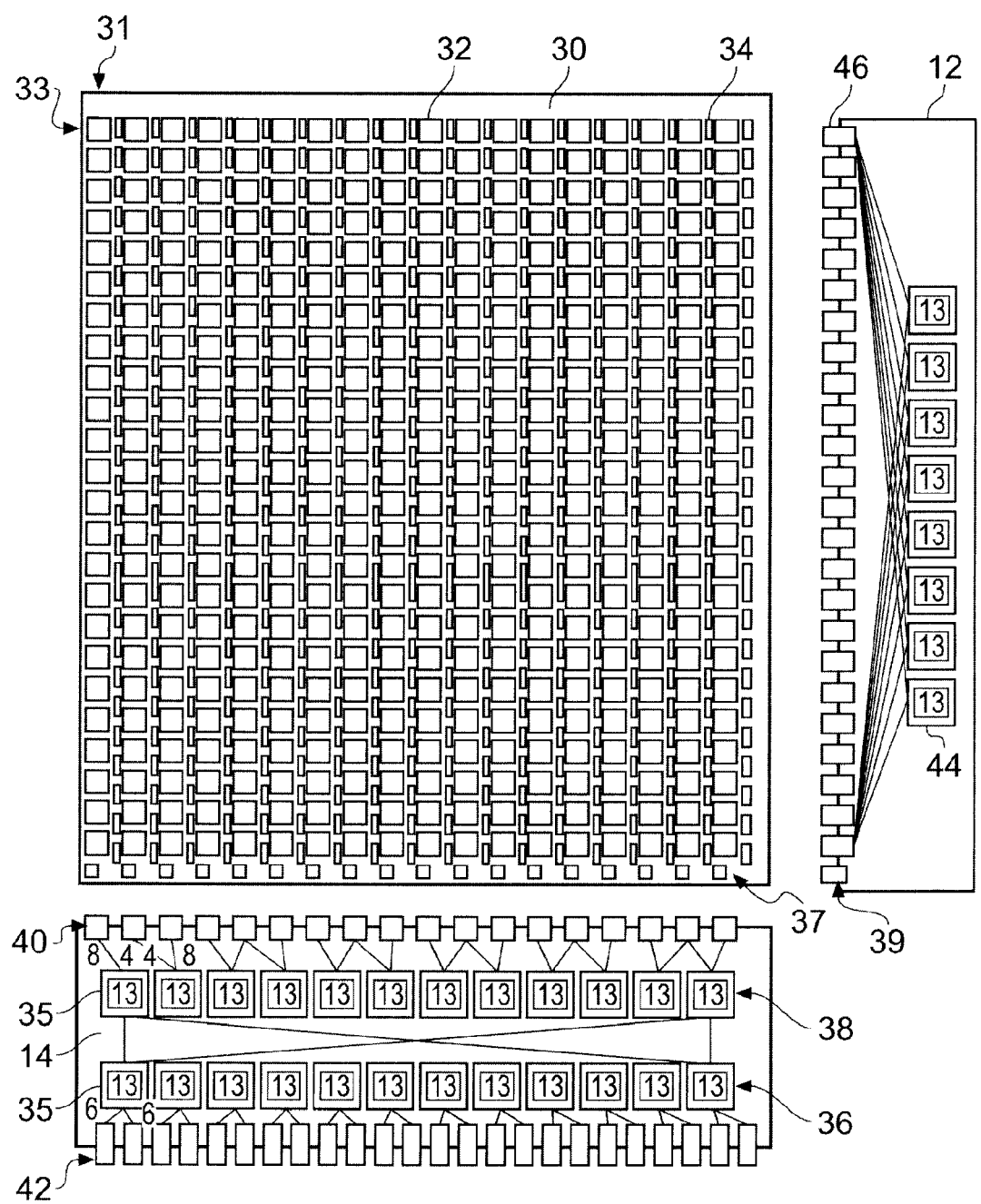
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

Also, although the fabric cards and the switch cards are described as being orthogonal to each other, they do not need to be exactly orthogonal to each other. Indeed, it should be appreciated that in an alternative embodiment they could be angled with respect to each other but need not be exactly orthogonal to each other.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3 VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size n*n/2*n/2 in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4× links (there are 8 differential pairs per 4× link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
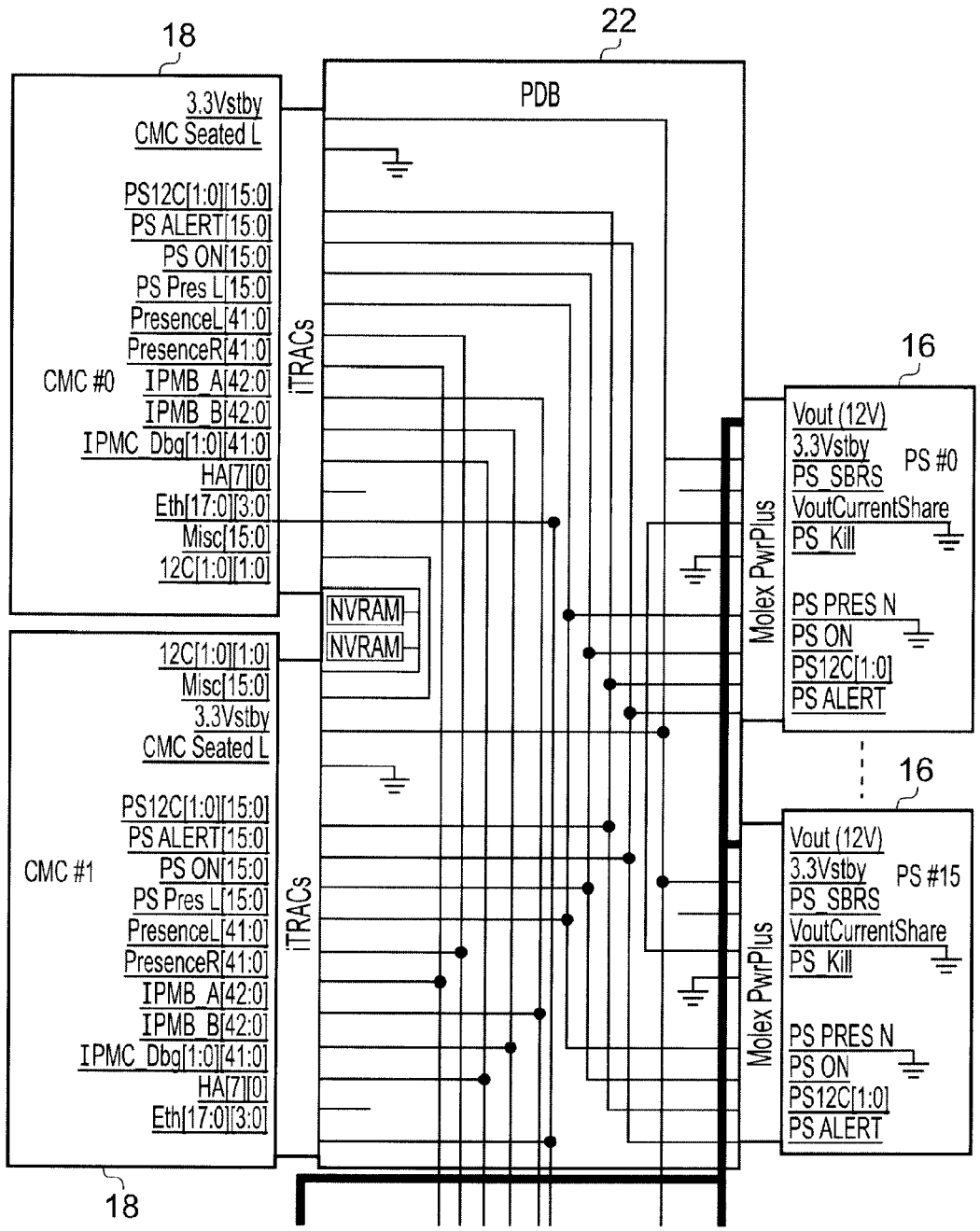
FIG. 4, formed of FIGS. 4A and 4B, is a schematic diagram of an example management infrastructure.
Figure 4B:
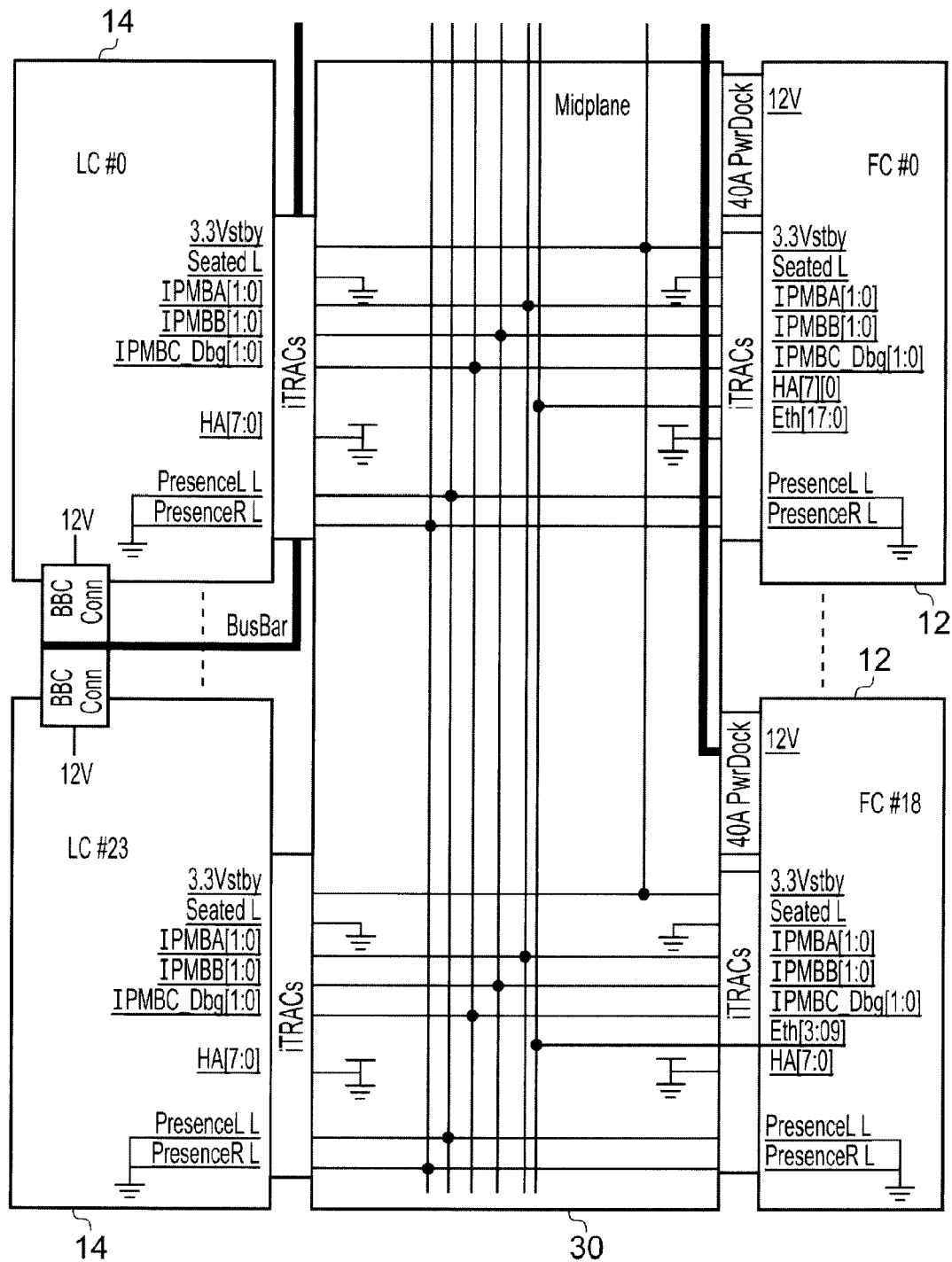

FIG. 4, formed of FIGS. 4A and 4B, is a schematic diagram of an example management infrastructure. This example provides redundant chassis management controllers 18. In addition each fabric card 12 and line card 14 supports an management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis.

Figure 5:
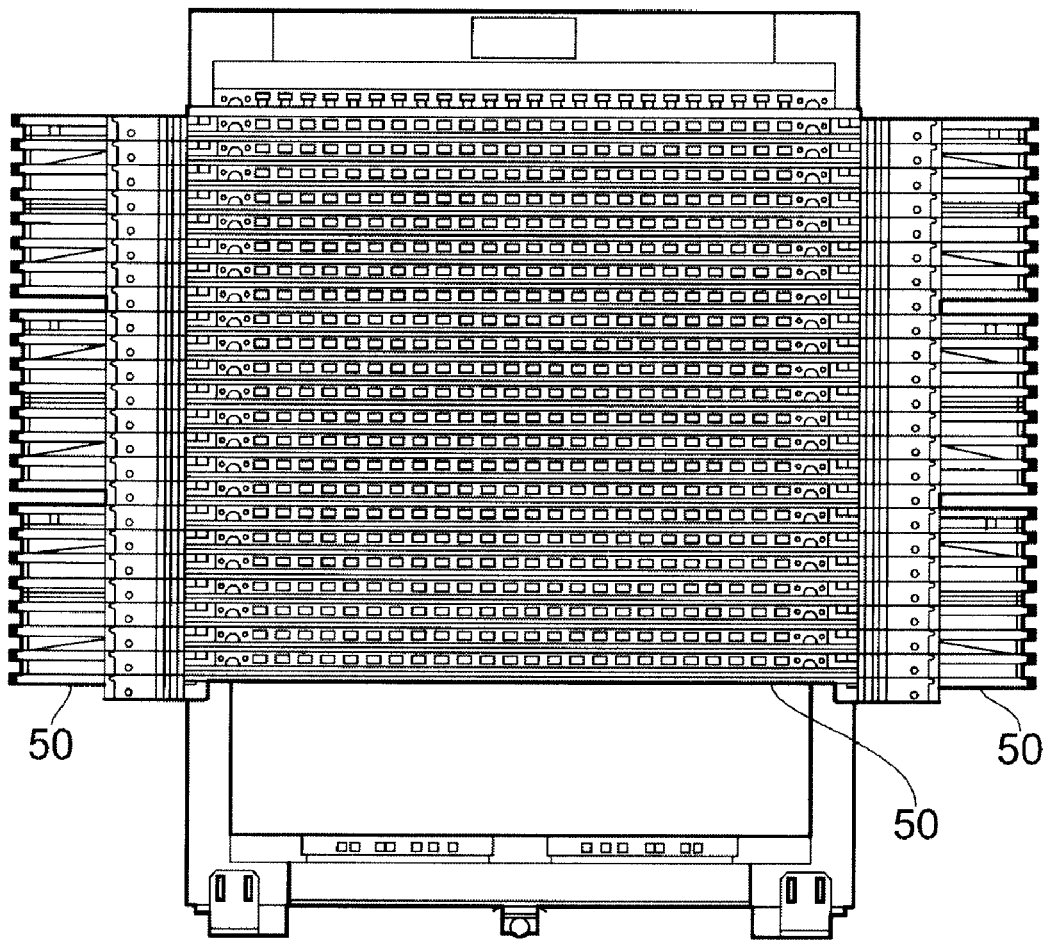
FIGS. 5 to 11 are views of an example of a switch chassis.
Figure 6:
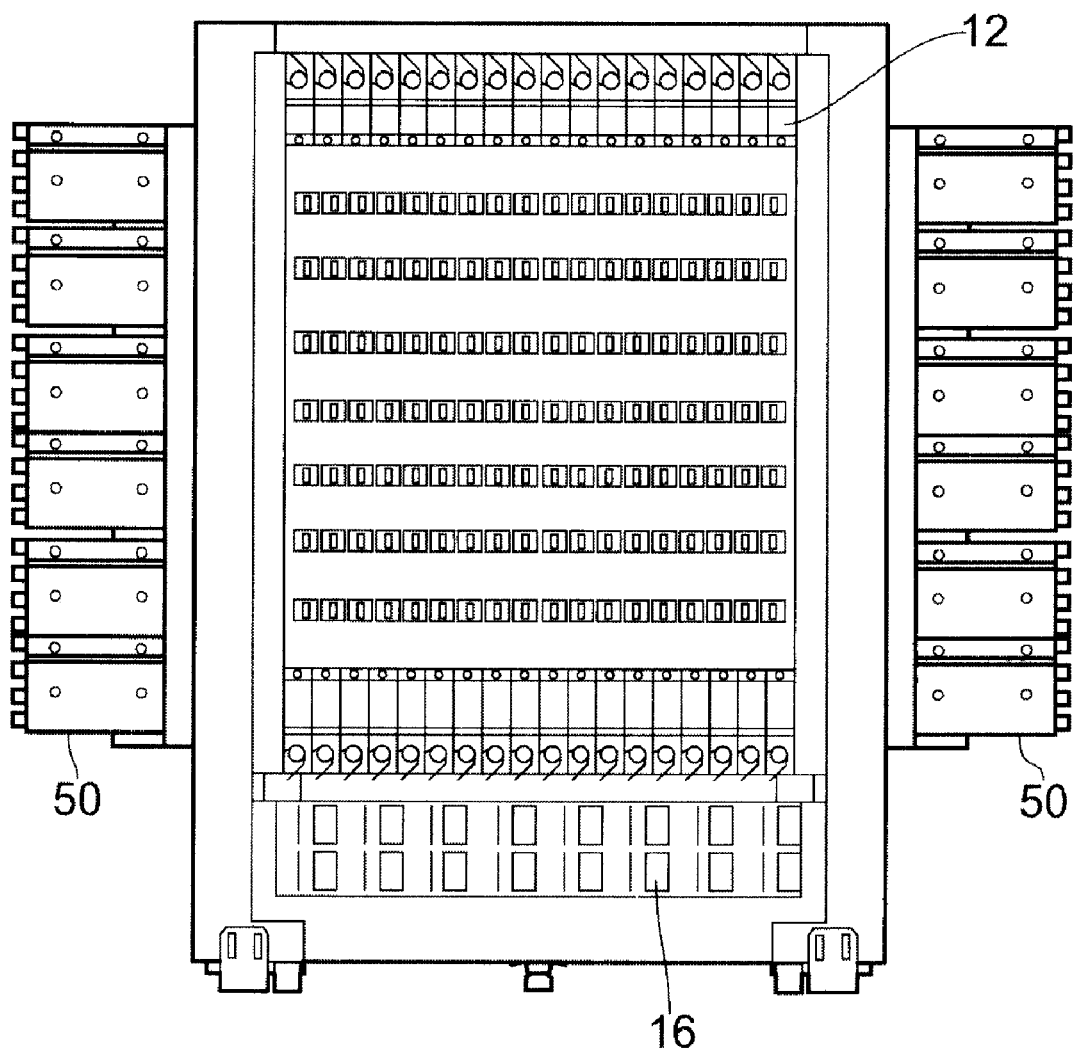
Figure 7:
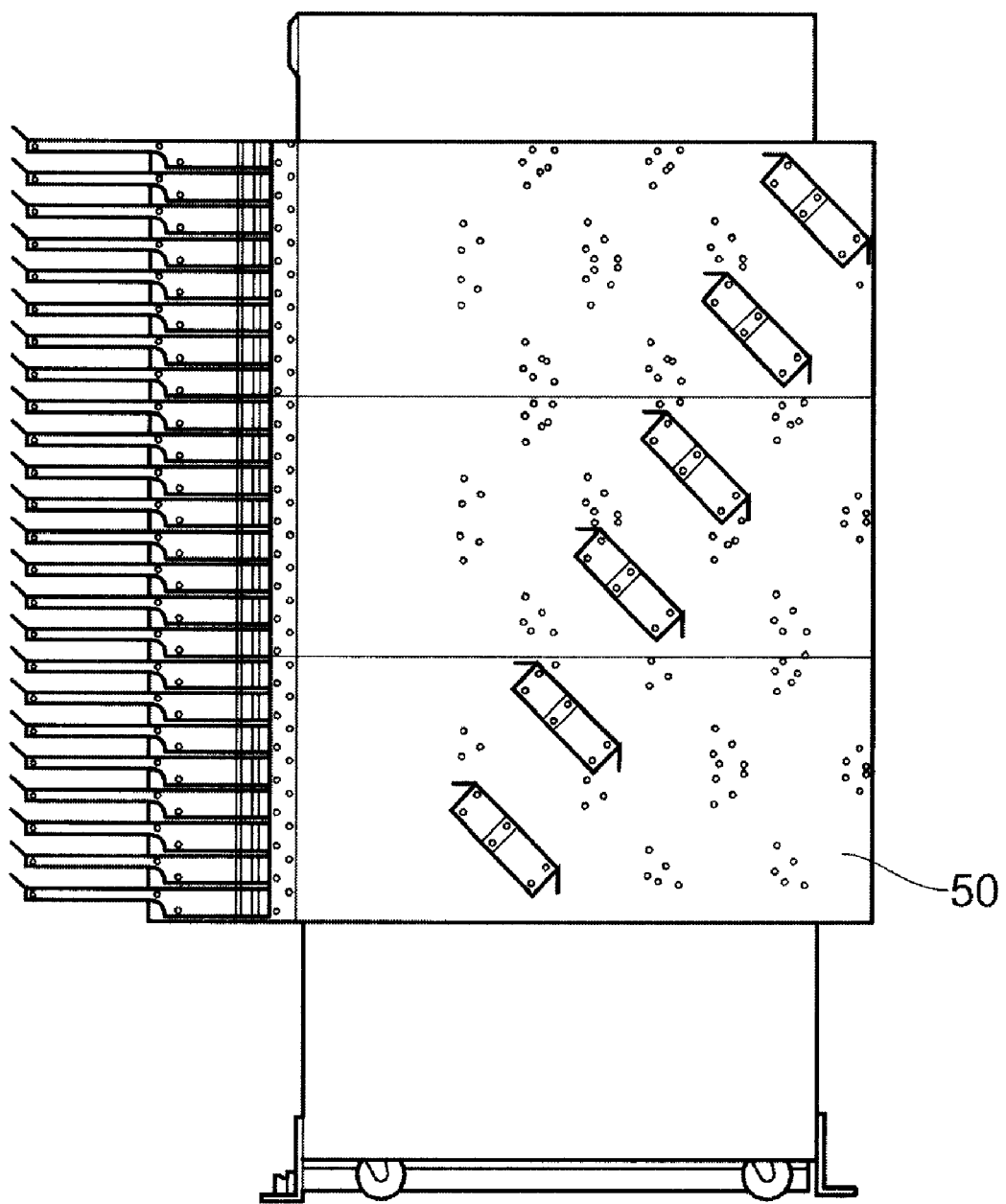
Figure 8:
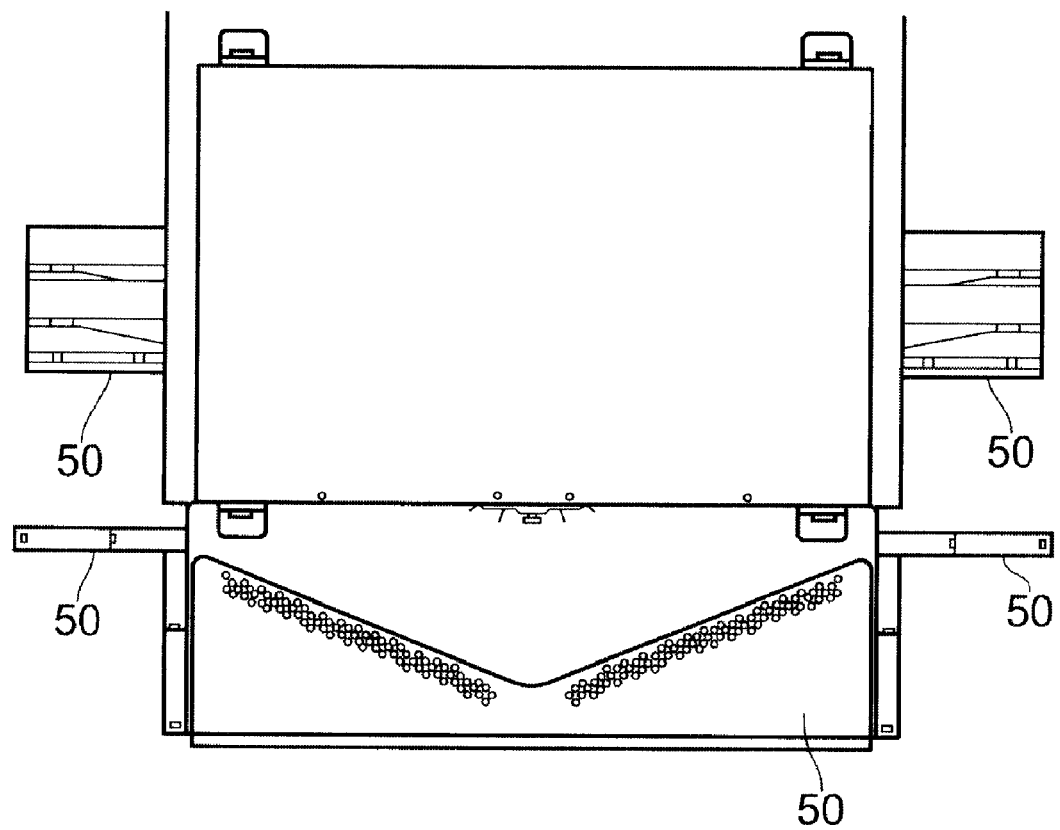
Figure 9:
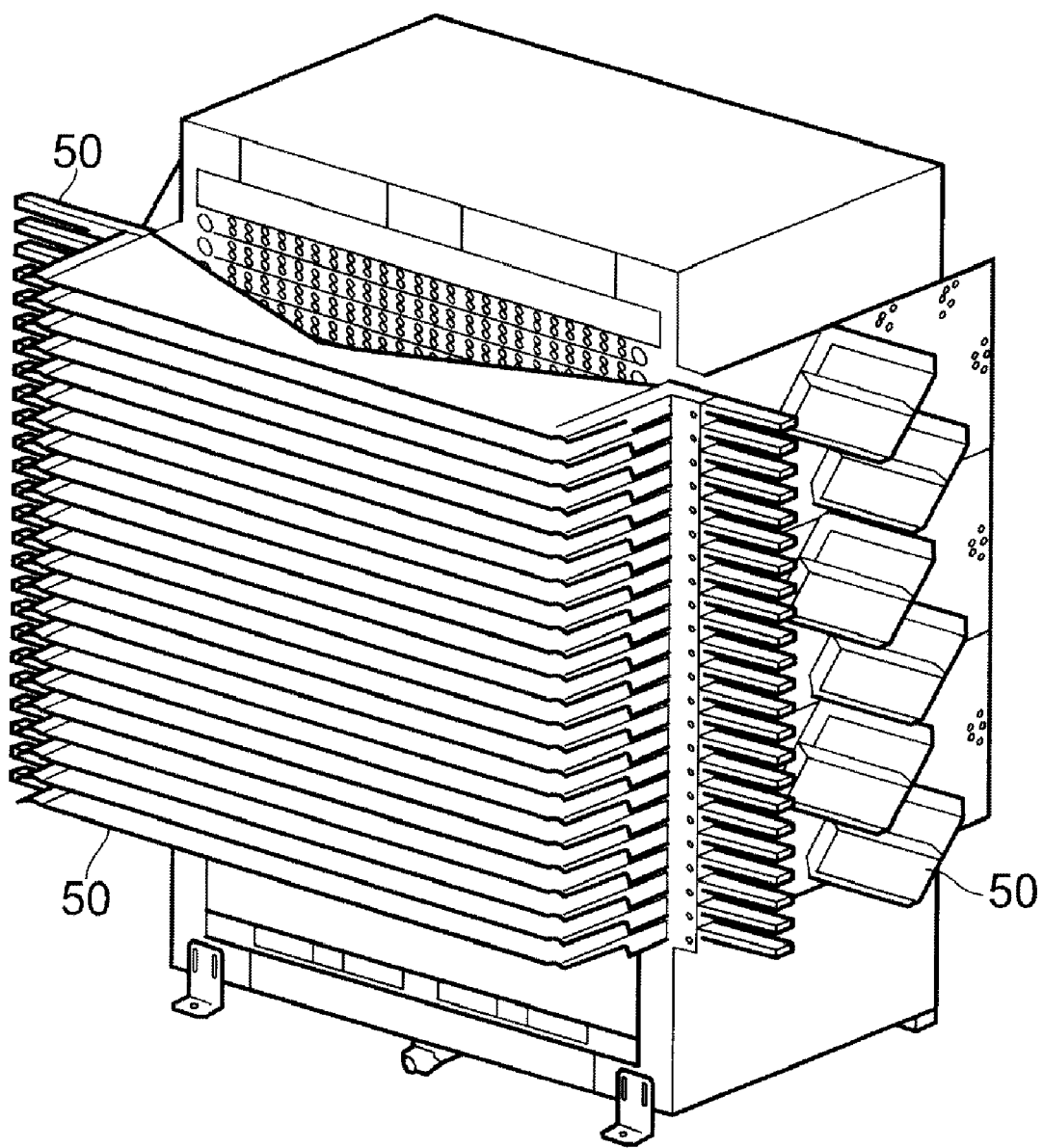
Figure 10:
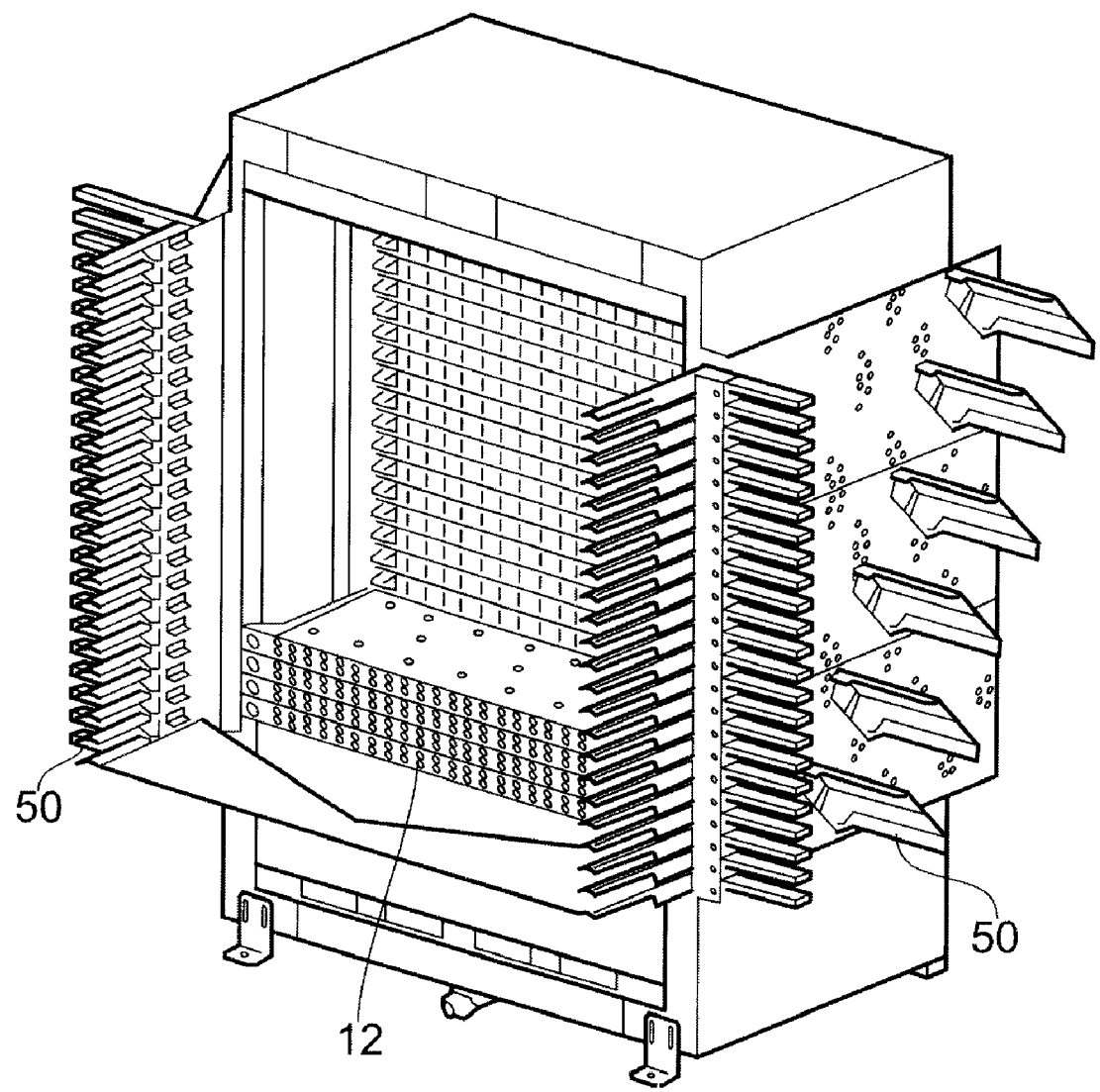
Figure 11:
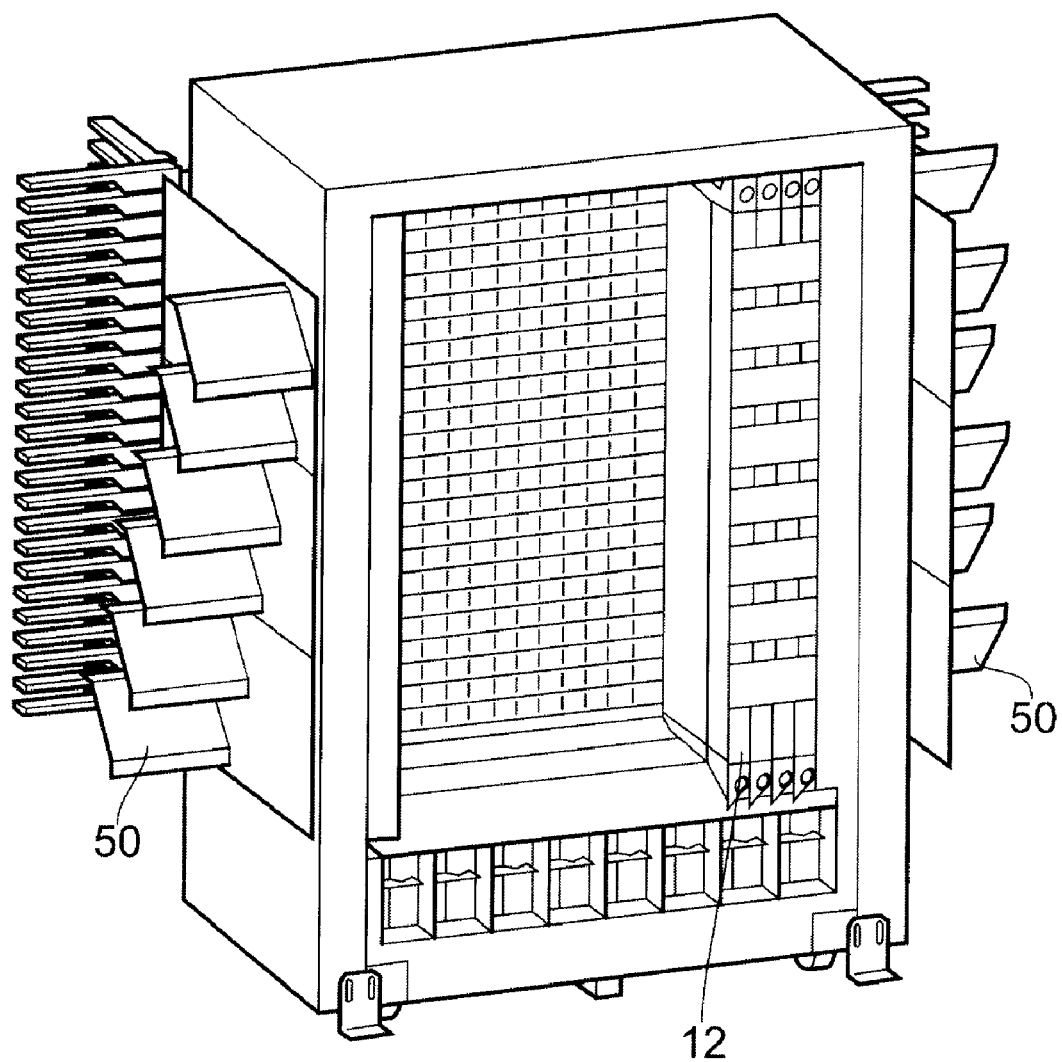

FIG. 5 is a front view of the switch chassis 10 showing cable management structures 50. FIG. 6 is a rear view of the switch chassis 10 showing the fabric cards 12, the power supply units 16 and cable management structures 50. FIG. 7 is a side view of the switch chassis 10 further showing the cable management structures 50. FIG. 8 is a side view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12 (rear) side showing four fabric cards 12 installed vertically in the chassis 10 and part of the cable management structures 50.

Figure 12:
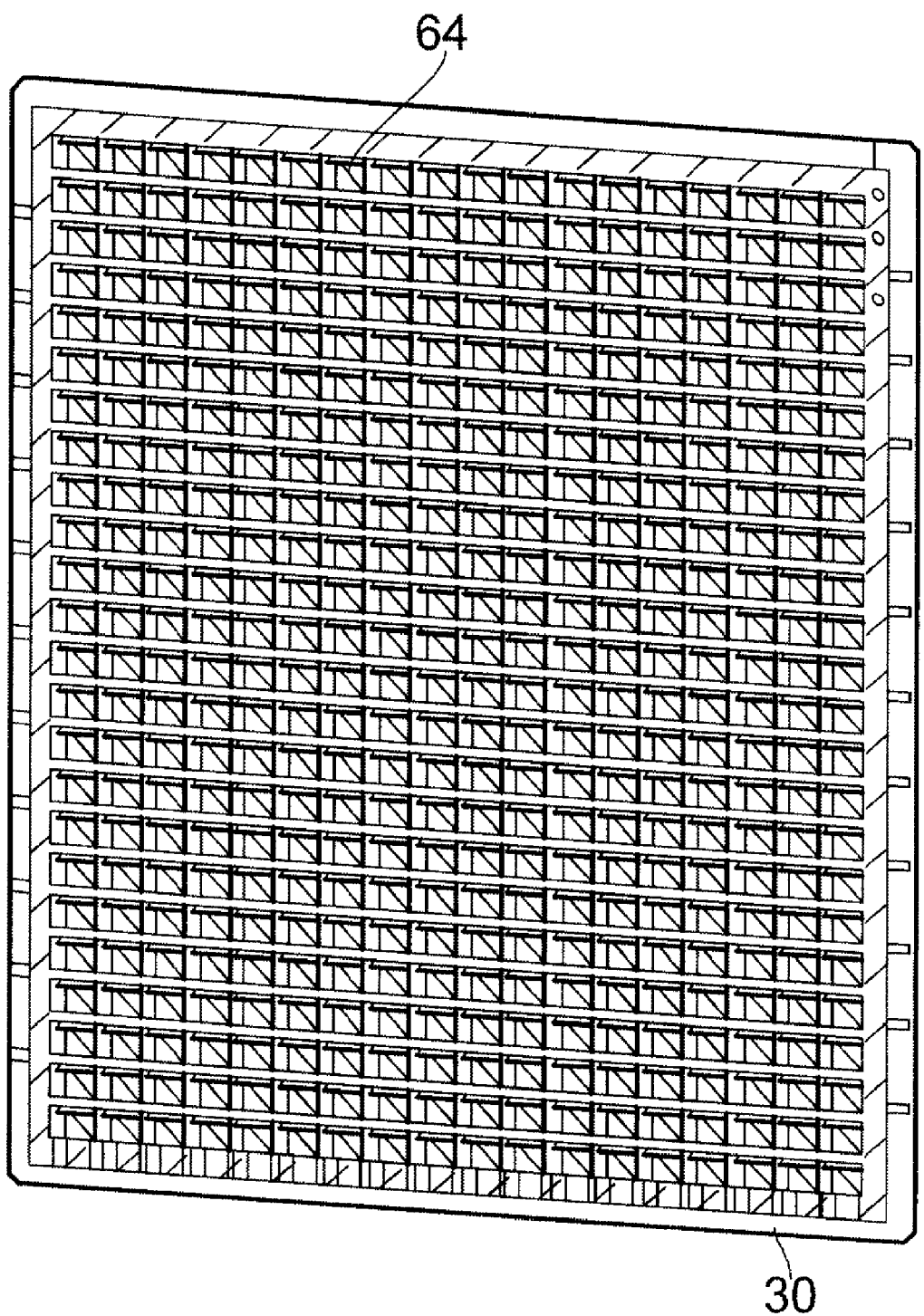
FIG. 12 is a first isometric view of an example of a midplane.
Figure 13:
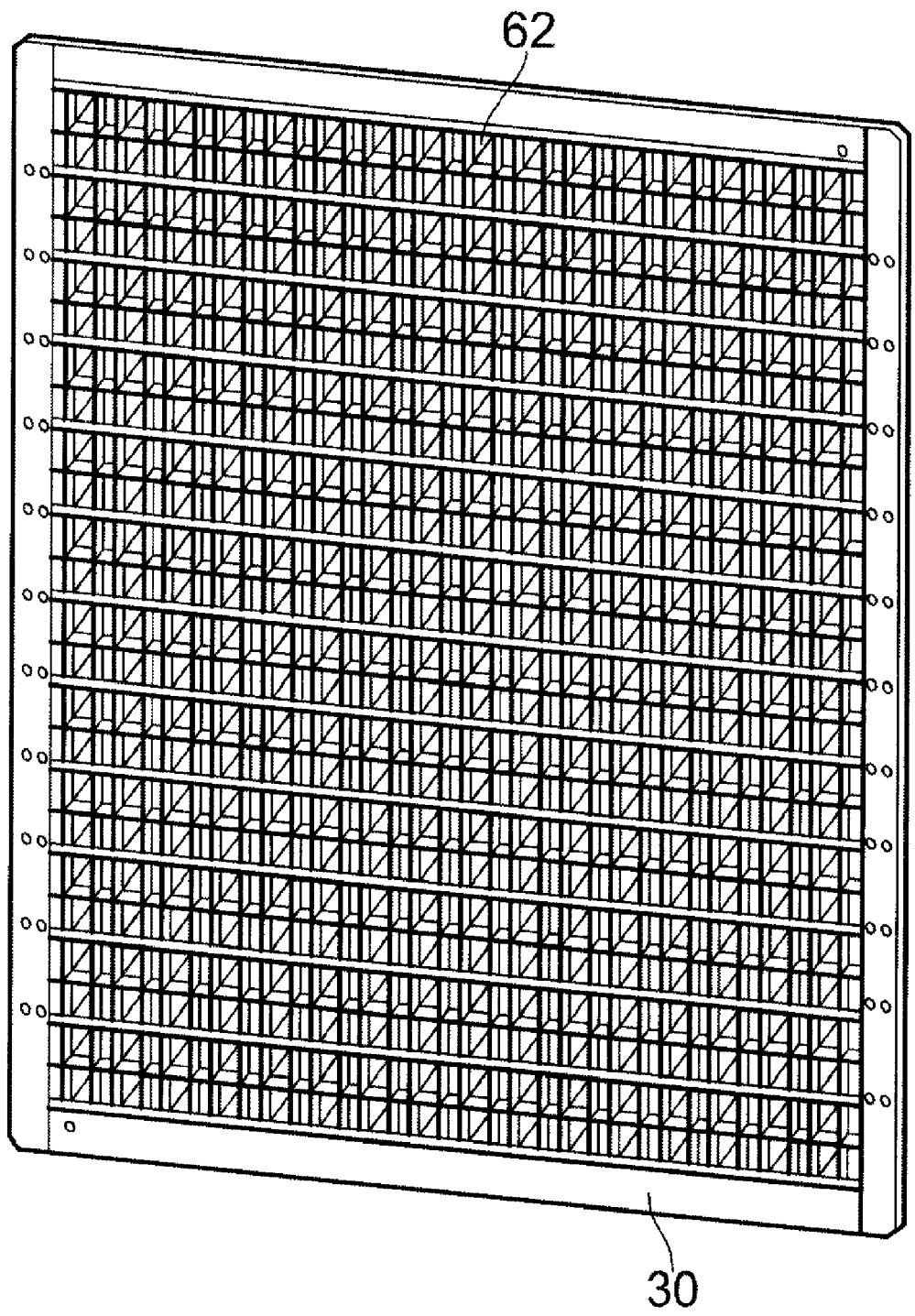
FIG. 13 is a further isometric view of an example of a midplane.

FIGS. 12 and 13 provide various schematic views of an example of a midplane 30. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
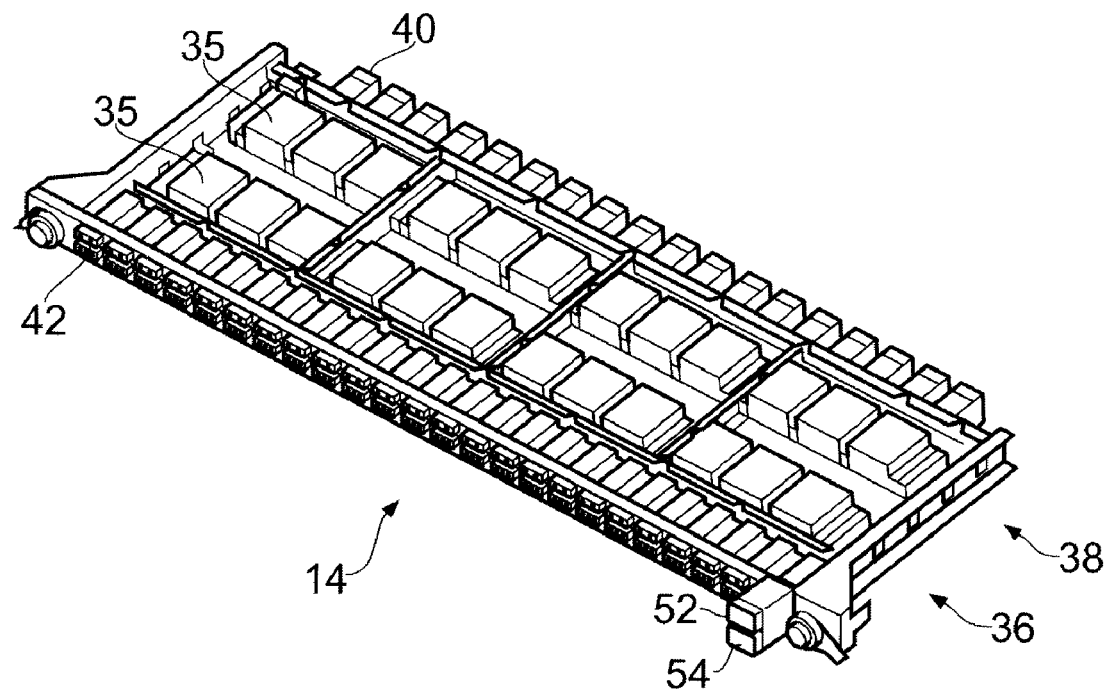
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
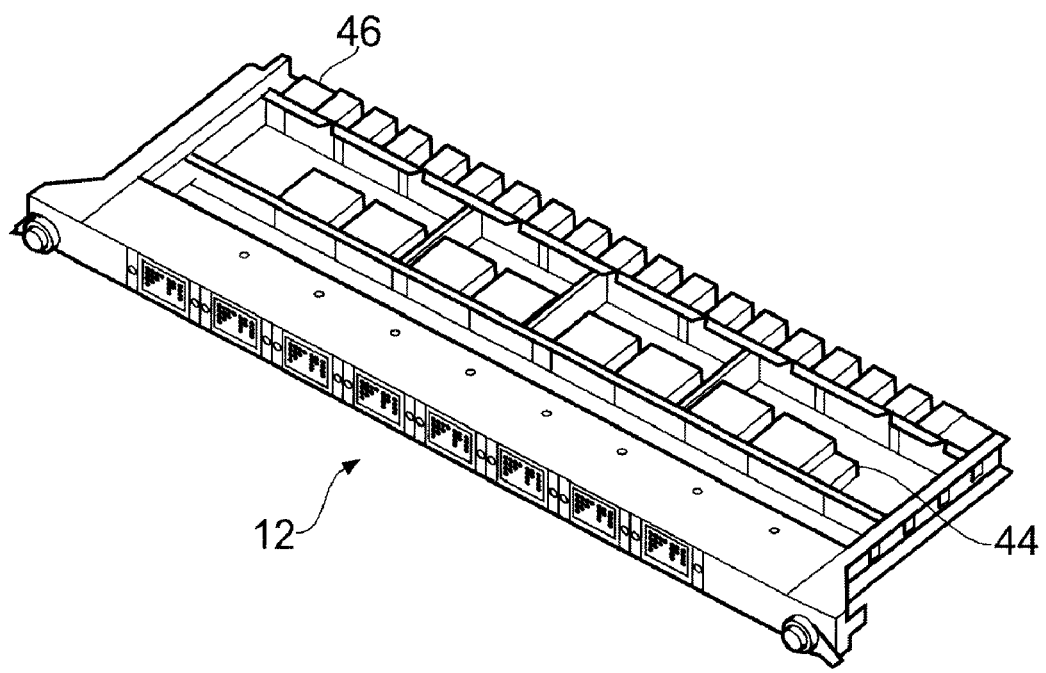
FIG. 15 is an isometric view of an example of a fabric card.

FIG. 15 is an isometric view of an example of a fabric card 12. This shows the fabric card connectors 46 and the switch elements 44.

Figure 16:
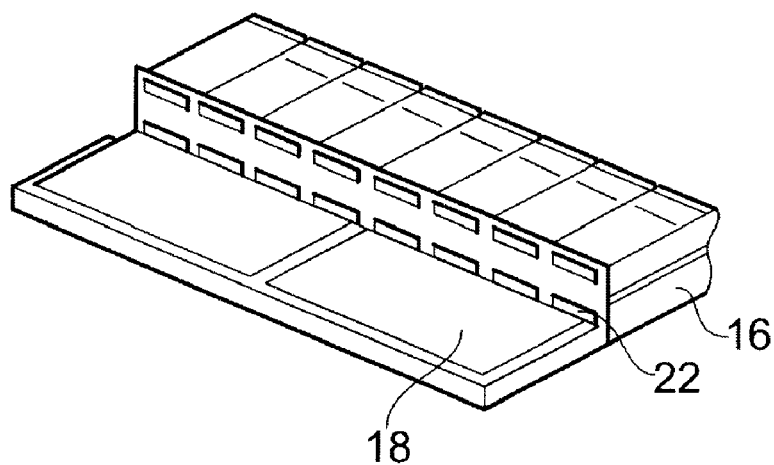
FIG. 16 is schematic representations of part of a switch chassis.
Figure 17:
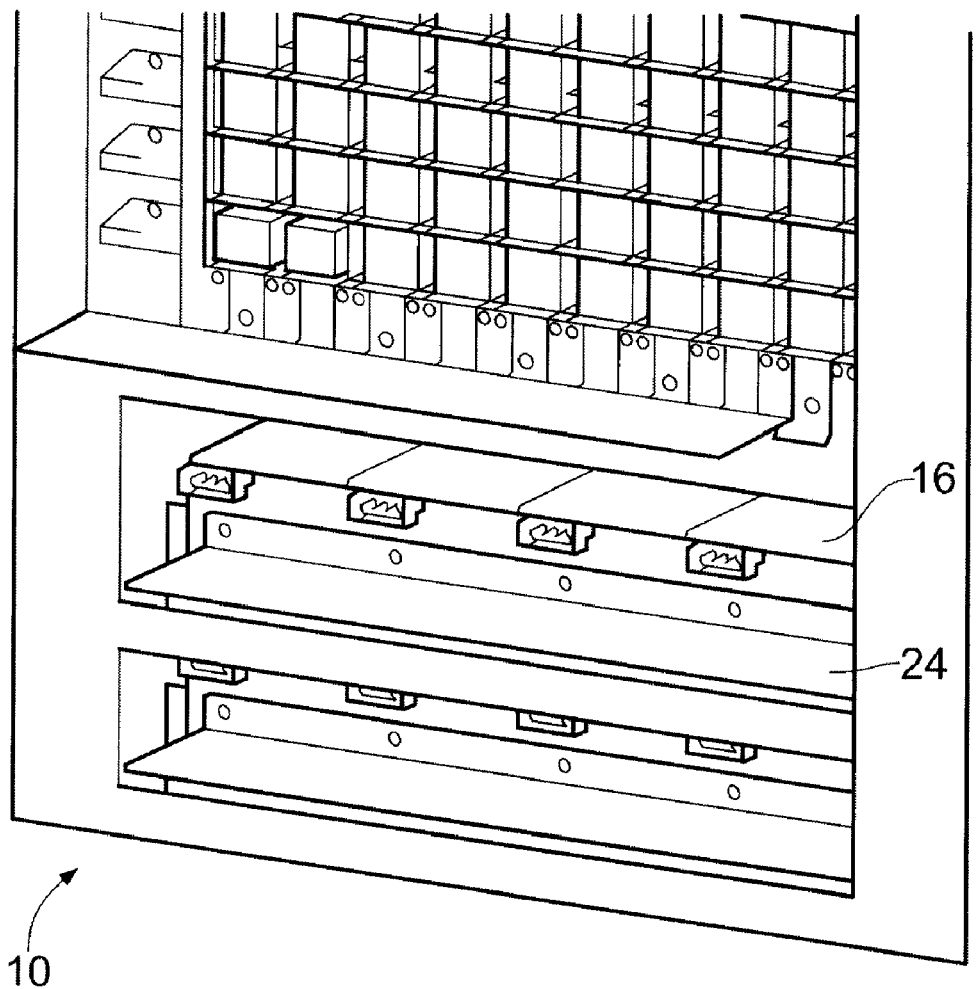
FIG. 17 is a further schematic representation of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers 18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 busbar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card, two Rj45 connectors with magnetics for Ethernet available on a chassis management card panel, two Rj45 connectors for serial available at the chassis management card panel, three Rj45 for line card/fabric card debug console access at the chassis management card panel, three HEX rotary switches used to select between which line card/fabric card debug console is connected to the three Rj45s above, and a 220-pin connector for the mezzanine.

In the present example a mezzanine has dimensions: 92.0 mm×50.8 mm and comprises 4 mounting holes for screws with either 5 mm or 8 mm standoff from the chassis management card board, a 220-pin connector for connectivity to chassis management board.

Figure 18:
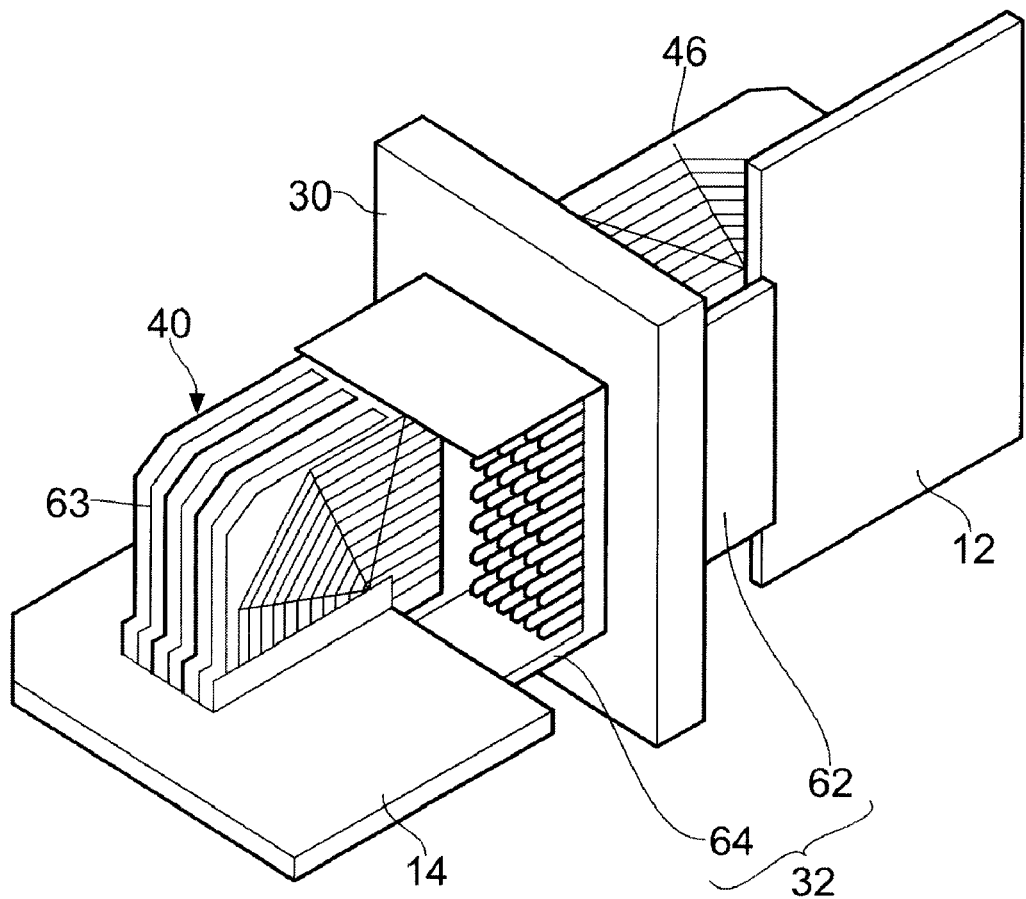
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
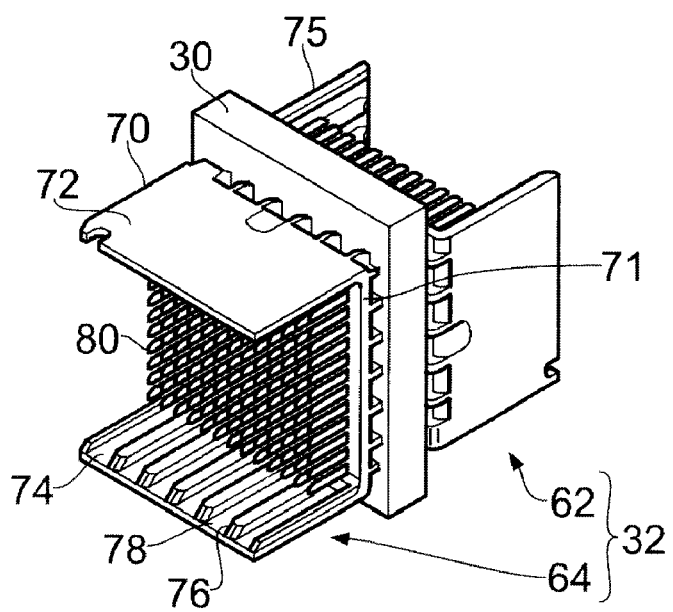
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
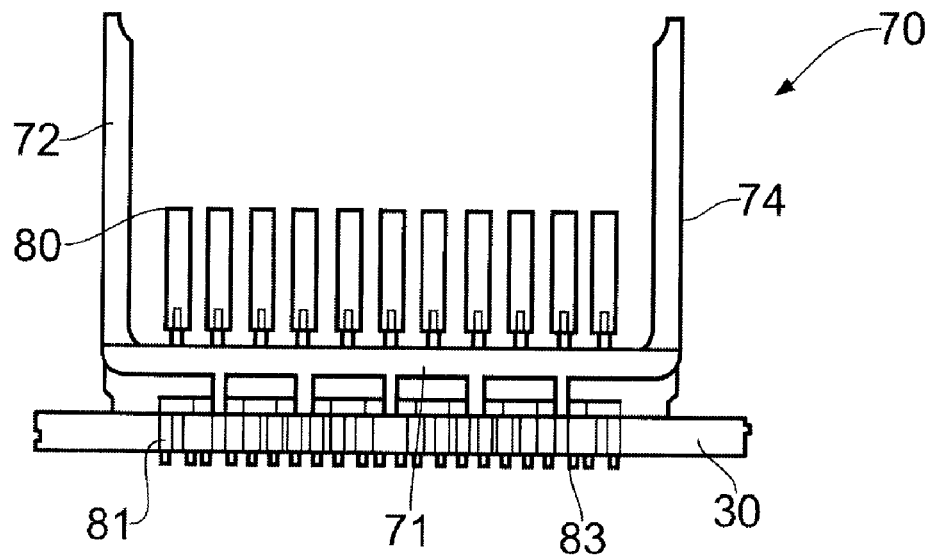
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector (e.g., the first midplane 62) of the midplane connector pair would be inserted into the pass through vias in the other side of the midplane 30 in the orthogonal orientation as discussed previously.

Figure 21:
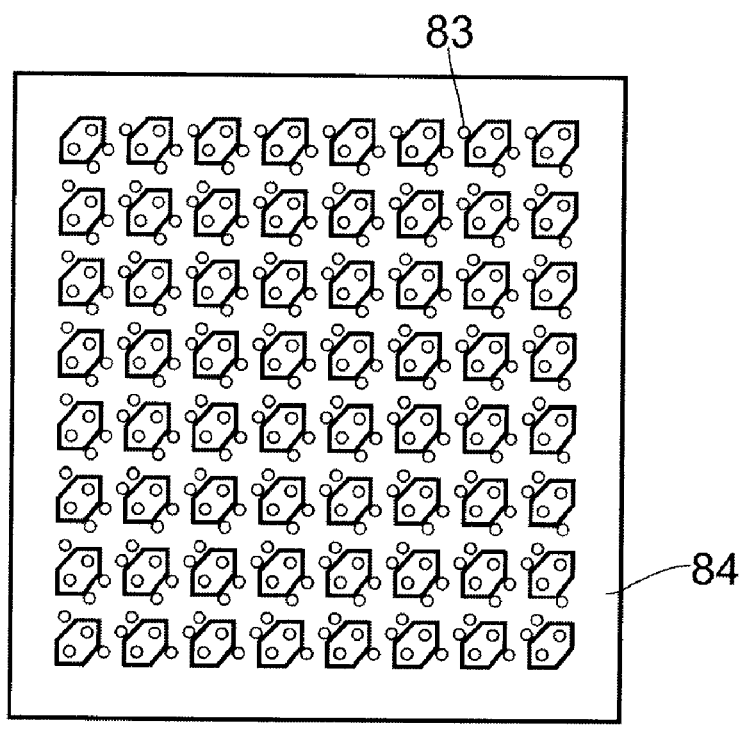
FIG. 21 is a plan view of an example configuration of vias for the orthogonal connector pairing of FIG. 19.
Figure 22:
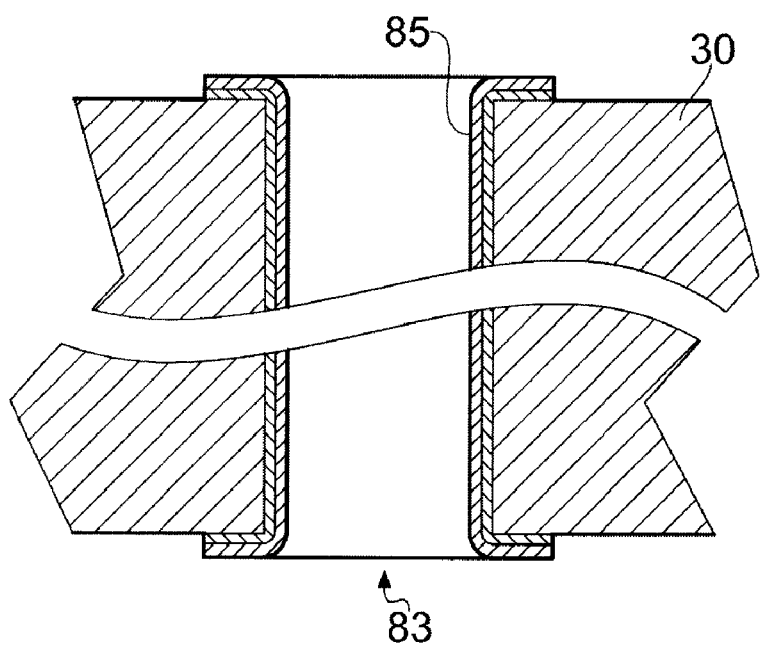
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
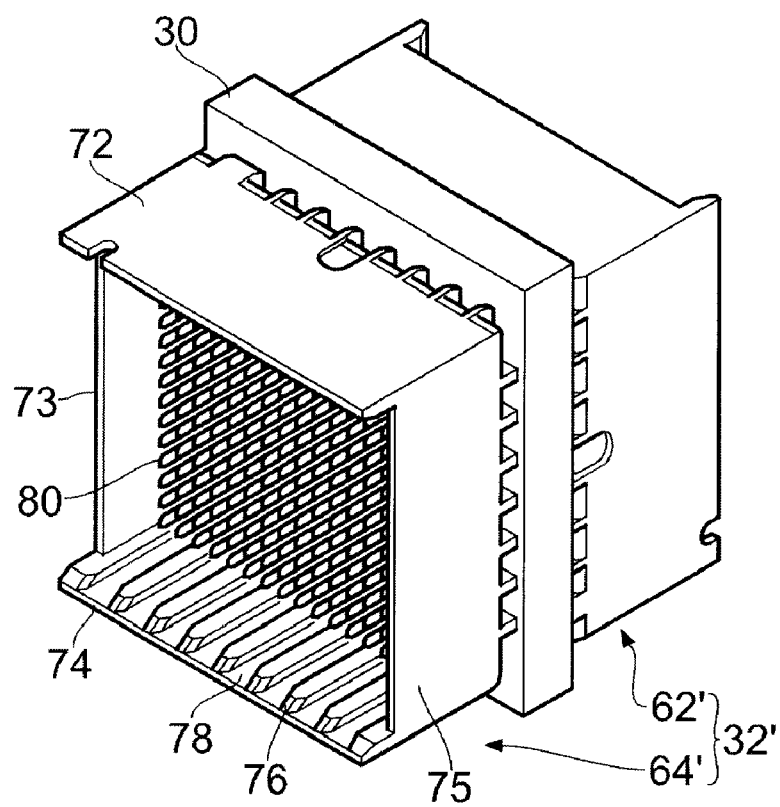
FIG. 23 is a schematic side view of example of an alternative to the connector of FIG. 20.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other embodiments the first and second midplane connectors could have different shapes and/or configurations appropriate for the connections for the cards to be connected thereto.

Also, although in the above described embodiment the midplane connector pairs 32 are configured as first and second connectors 62 and 64, in another embodiment they could be configured as a single connector that is assembled in the midplane. For example, through connectors could be provided that extend through the midplane vias. The through connectors could be manufactured to be integral with a first connector frame (e.g., a U-shaped frame or a box-shaped frame as in FIGS. 19 and 23, respectively) and the contacts inserted through the vias from a first side o the midplane 30. Then a second connector frame could be inserted over the connectors on the second side of the midplane 30 in a mutually orthogonal orientation to the first connector frame.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 14 can be connected to each of a set of vertically aligned fabric cards 12 without needing intermediate wiring.

Figure 24:
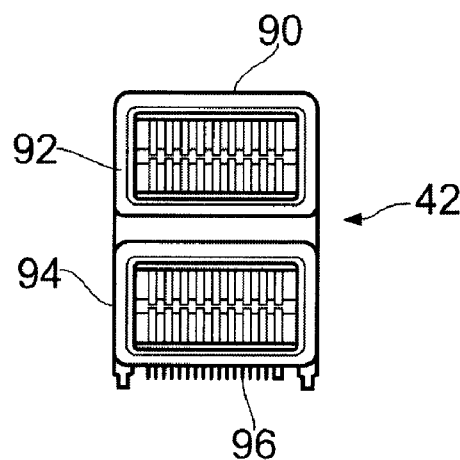
FIG. 24 is a schematic end view of an example cable connector.
Figure 25:
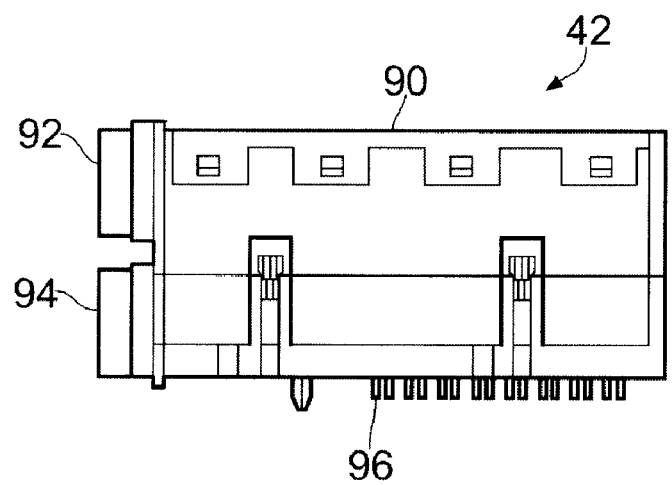
FIG. 25 is a schematic side view of the example cable connector.
Figure 26:
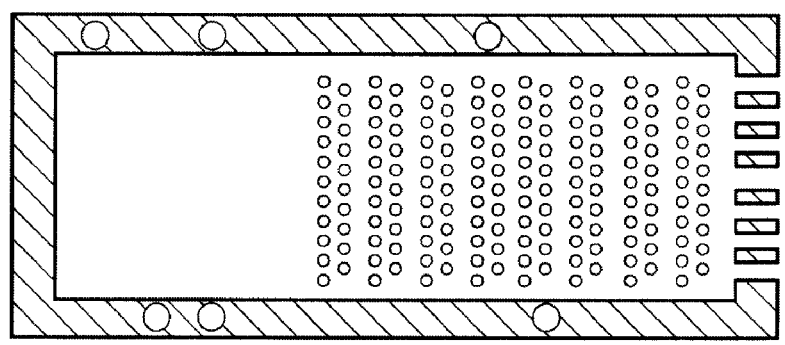
FIG. 26 represents a footprint of the cable connector.

FIGS. 24 and 25 provide an end view and a side view, respectively, of an example of a cable connector 42 as mentioned with reference to FIGS. 3 and 14. As shown in FIGS. 24 and 25, the cable connectors 24 and 25 include first and second cable connections 92 and 94 stacked within a single housing 90. This provides for a very compact design. Board contacts 96 are provided for connecting the connector to a line card 14. FIG. 26 is a plan view of the connector footprint for the board contacts 96 of the cable connector 42. The stacked arrangement facilitates the providing of line cards that are high density line cards supporting a 12× cable providing 24 line pairs with 3 4× links aggregated into a single cable. The cable connectors provide 12× cable connectors that are smaller than a conventional 4× connector, 3× denser than a standard InfiniBand 4× connector and electrically and mechanically superior. Using 12× cable (24 pairs) can be almost 50% more area efficient than three 4× cables and requires three times fewer cables to install and manage.

Figure 28:
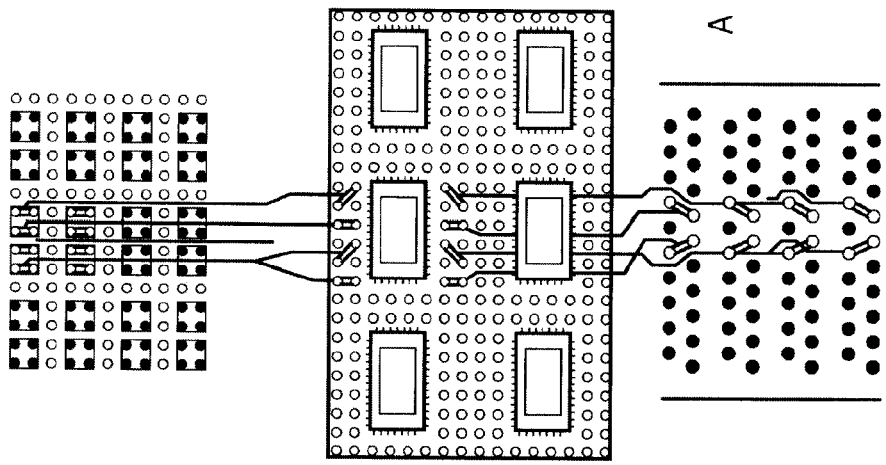
FIGS. 27 and 28 illustrates example of signal routing for a cable connector.
Figure 27:
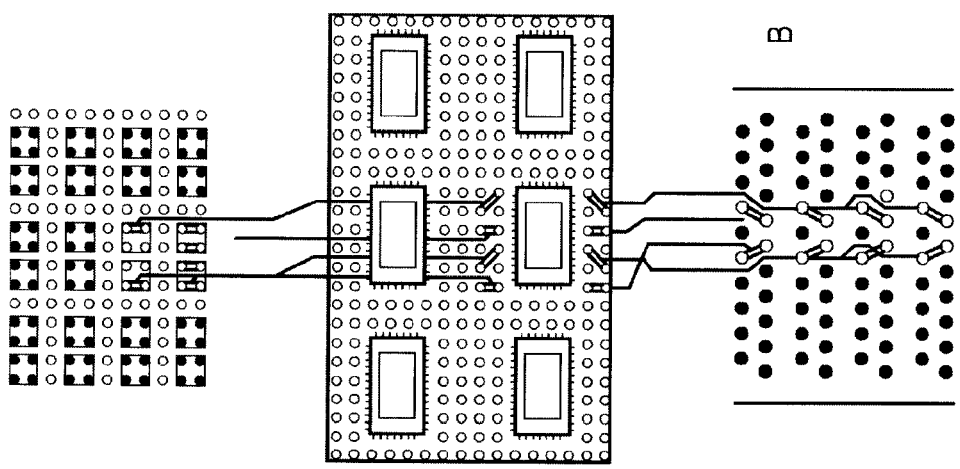

FIGS. 27 and 28 illustrate an example of the routing of signals from each of two 12× port sections 92 and 94 of a cable connector 42 to the equalizers and to a switch chip on a line card 14. FIG. 27 shown an example of routing from a first 12× port section. FIG. 28 shows an example of the routing from a second 12× port section. The transmit (Tx) lines are equalized, and can be connected directly from the switch chip to the cable connector. The lines can be routed on lower layers in order to minimize via stub effects.

Figure 29:
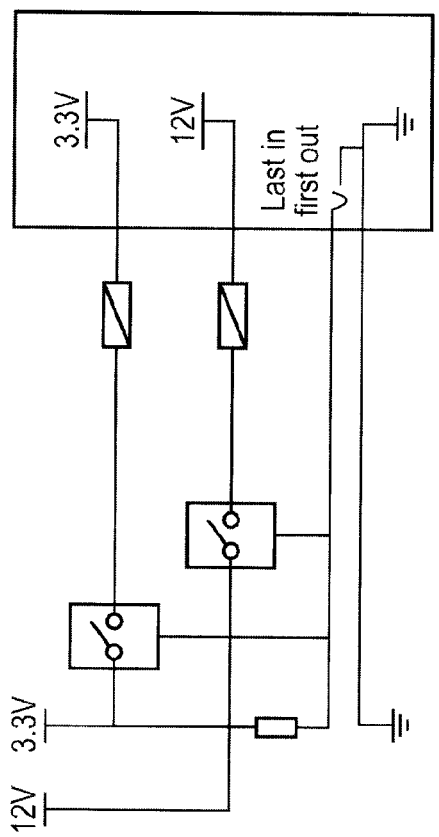
FIG. 29 illustrates an example of a power supply for the cable connector.
Figure 30:
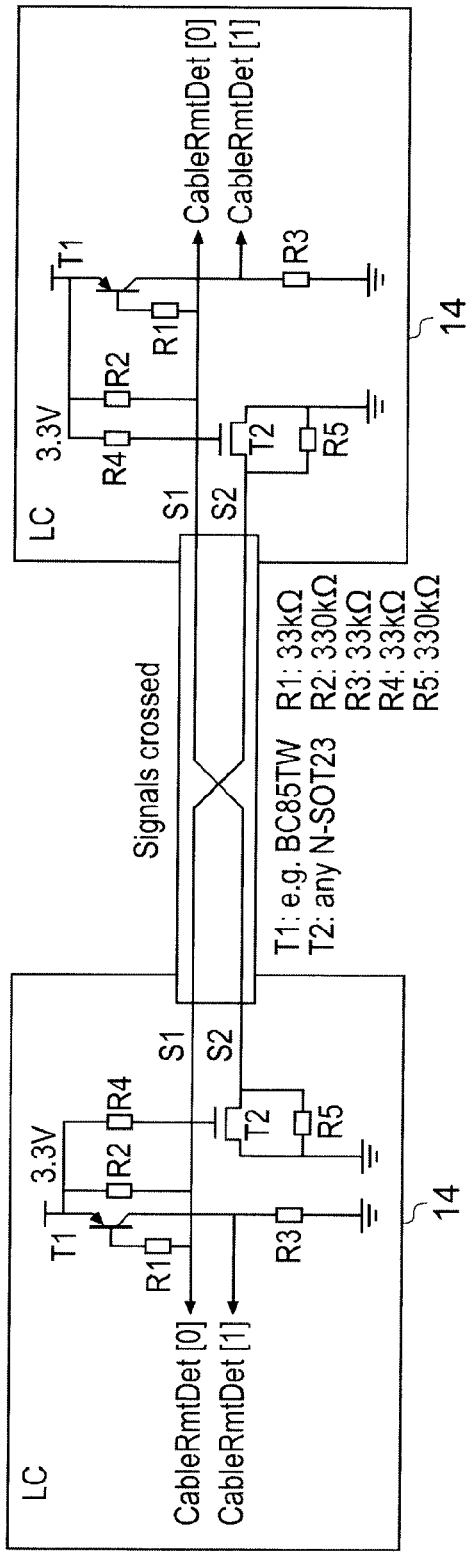
FIG. 30 illustrates an example of cable status sense detection circuitry.
Figure 31:
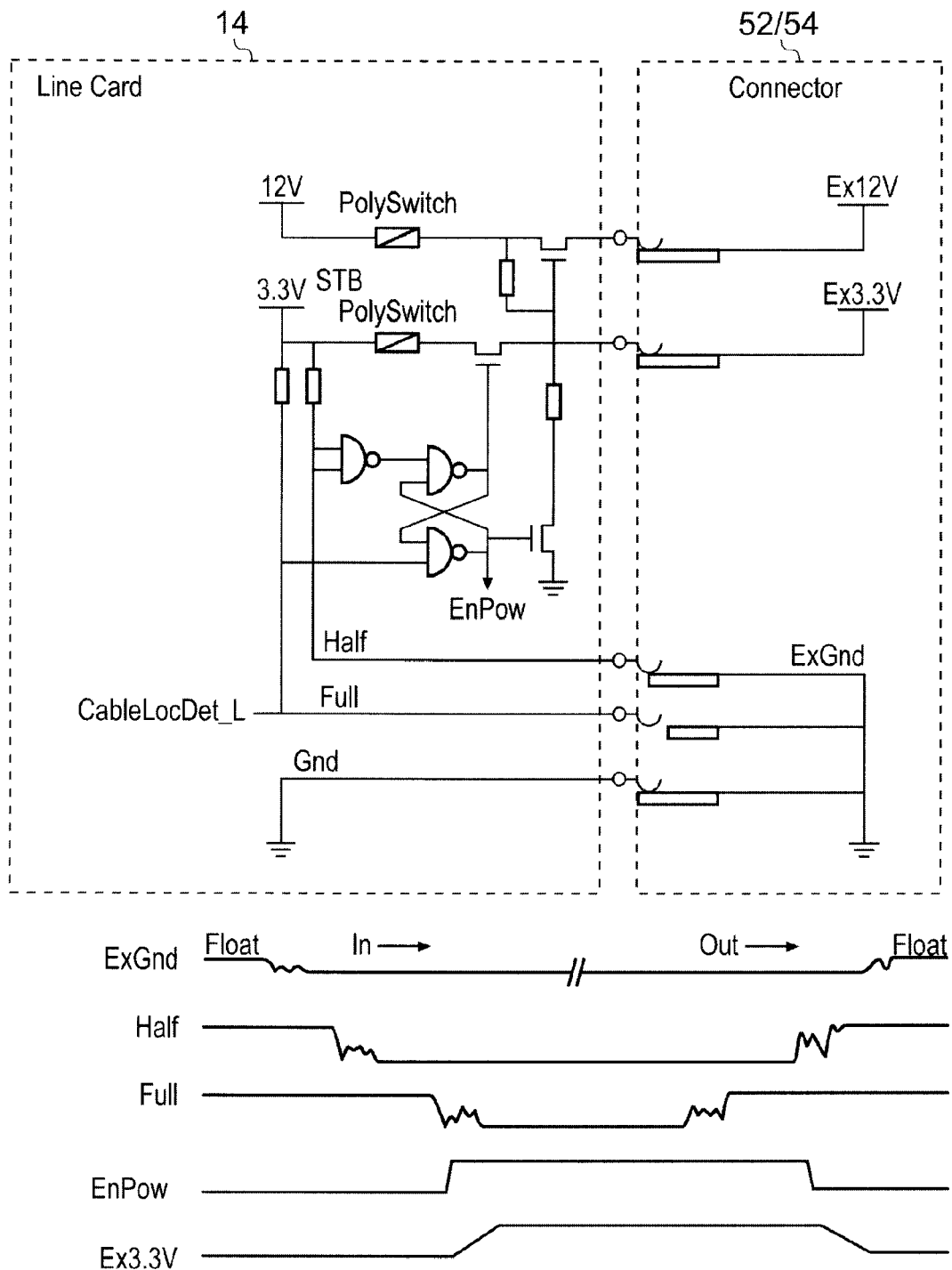
FIG. 31 illustrates an example of hot plug control circuitry.

FIG. 29 illustrates an example of a power supply for the cable connector and FIG. 30 illustrates an example of a cable status sense detection circuitry. The cable sense detection circuitry is operable to test from each end whether the other end is plugged or not, and, if plugged, to see if power from the power supply is on. Provisions are made such that "leaking" power from a powered to un-powered end is avoided. A valid status assumes that an active end is plugged. FIG. 31 is a schematic diagram of an example of a hot plug control circuit that enables hot plugging of cables. The switch chassis can thereby provide active cable support for providing active signal restoration at a cable connector. Active cable support can provides benefits of increased distances for copper cables as a result of active signal restoration at the connector, increased maximum cable distance by over 50%, using thinner and more flexible cables (e.g., reducing a cable diameter by up to 30%, which facilitates good cable management. A cable to connector interface can provide one, more or all of local and remote cable insertion detection, cable length indication, remote node power-on detection, remote power, a serial number and a management interface.

Figure 32:
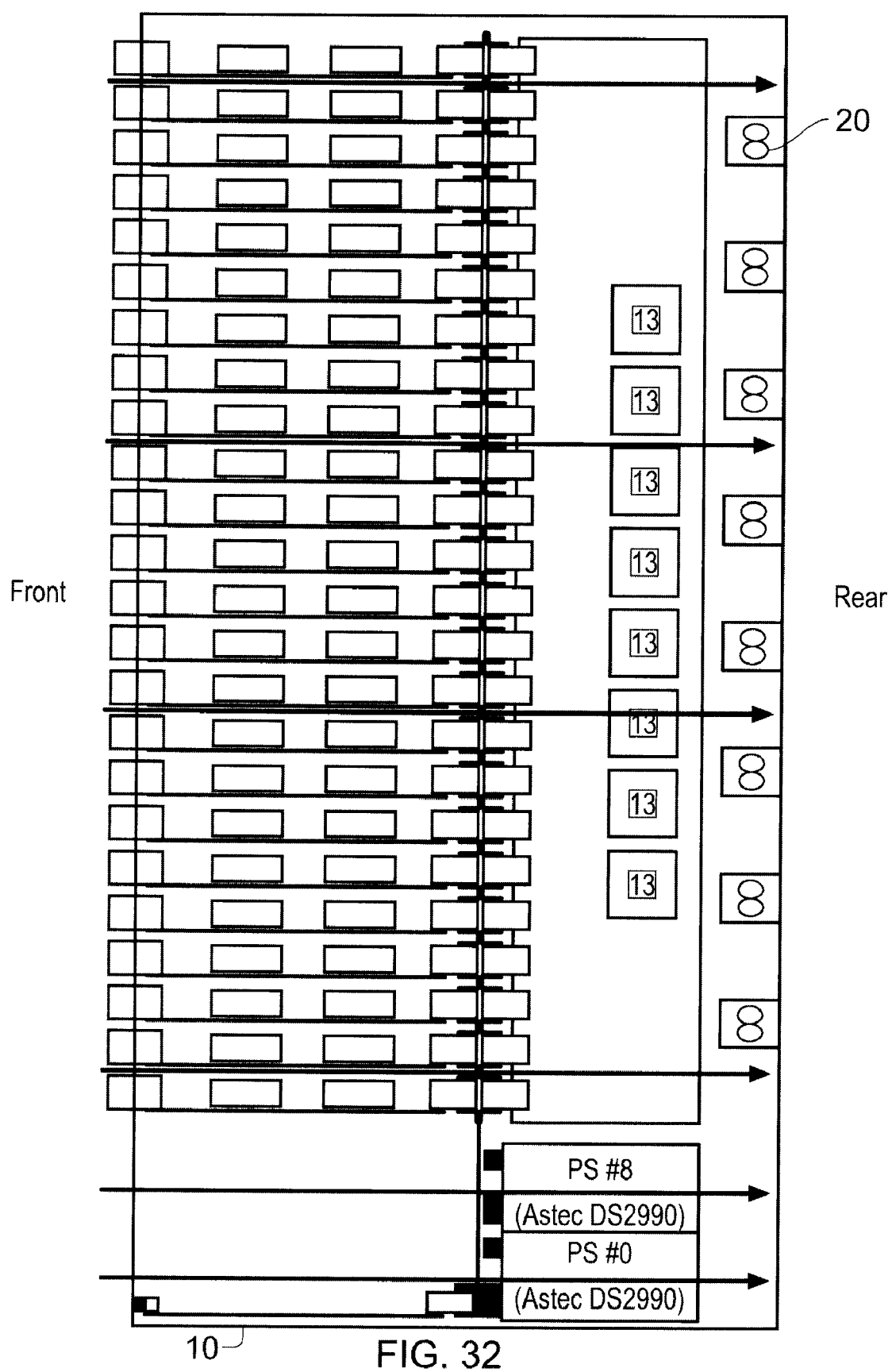
FIG. 32 is a schematic representation of airflow though a switch chassis.

FIG. 32 is a schematic representation of the airflow through an example switch chassis. As illustrated by the arrows, the airflow is from the front to the rear, being drawn through by fans 20 in the fabric cards 12 and the power supplies 18.

The air inlet is via perforations at the line card 14 front panel. Fans 20 at the fabric cards 12 pull air across the line cards, though the openings 34 in the vertical midplane 30 and across the fabric cards 12.

Line card cooling is naturally redundant since the fabric cards are orientated orthogonally to the line cards. In other words, cooling air over each line card is as a result of the contribution of the effect of the fans of the fabric cards along the line card due to the respective orthogonal alignment. In the case that a fabric card fails or is removed, a portion of the cooling capacity is lost. However, as the cooling is naturally redundant the line cards will continue to operated and be cooled by the remaining fabric cards. Each fan is internally redundant and the fans on the fabric cards 12 can be individually hot swappable without removing the fabric card 12 itself.

The fabric card 12 and line card 14 slots can be provided with blockers to inhibit reverse airflow when a card is removed. Empty line card 14 and fabric card 12 slots can be loaded with filler panels that prevent air bypass.

Each power supply has an internal fan that provides cooling for each power supply. Fans at the power supplies pull air through chassis perforations at the rear, across the chassis management cards 18, and through the power supply units 16. Chassis management card cooling is naturally redundant as multiple power supply units cool a single the chassis management card.

Although in the present example cooling is provided by drawing air from the front to the rear, in another example embodiment cooling could be from the rear to the front.

A switch system as described above can provide a switch matrix that includes a configurable, protocol agnostic, packet switching core. It can provide a non-blocking switch connecting a configurable number of ports together. This will be described in more detail in the following.

An example switch matrix can receive as its input data packets of any variety as a raw stream of data along with sideband control signals indicating start/stop, size and routing instructions for the packet. It can buffers these packets as needed in virtual output queues, schedules them for transmission using a distributed, iterative routing mechanism and, once the scheduling is complete, transmits the packets to their destination port. The data path width can be a configurable parameter and, in the present example can be any multiple of 8 (currently supported data widths are 64 and 128 bits).

The basic building block in the example switch matrix is referred to herein as Switch Matrix Unit (XMU). Each XMU implements one port connection. Optionally, an XMU can be configured in a Time Division Multiplex (TDM) mode, wherein it connects to a TDM port and can be configured to function as multiple ports simultaneously. Valid TDM port configurations are dependent on the data width being used. If it is intended to make use of the TDM concept then the data path width can be further constrained to a number of bytes that is a divisible by the number by the number of ports supported.

Figure 33:
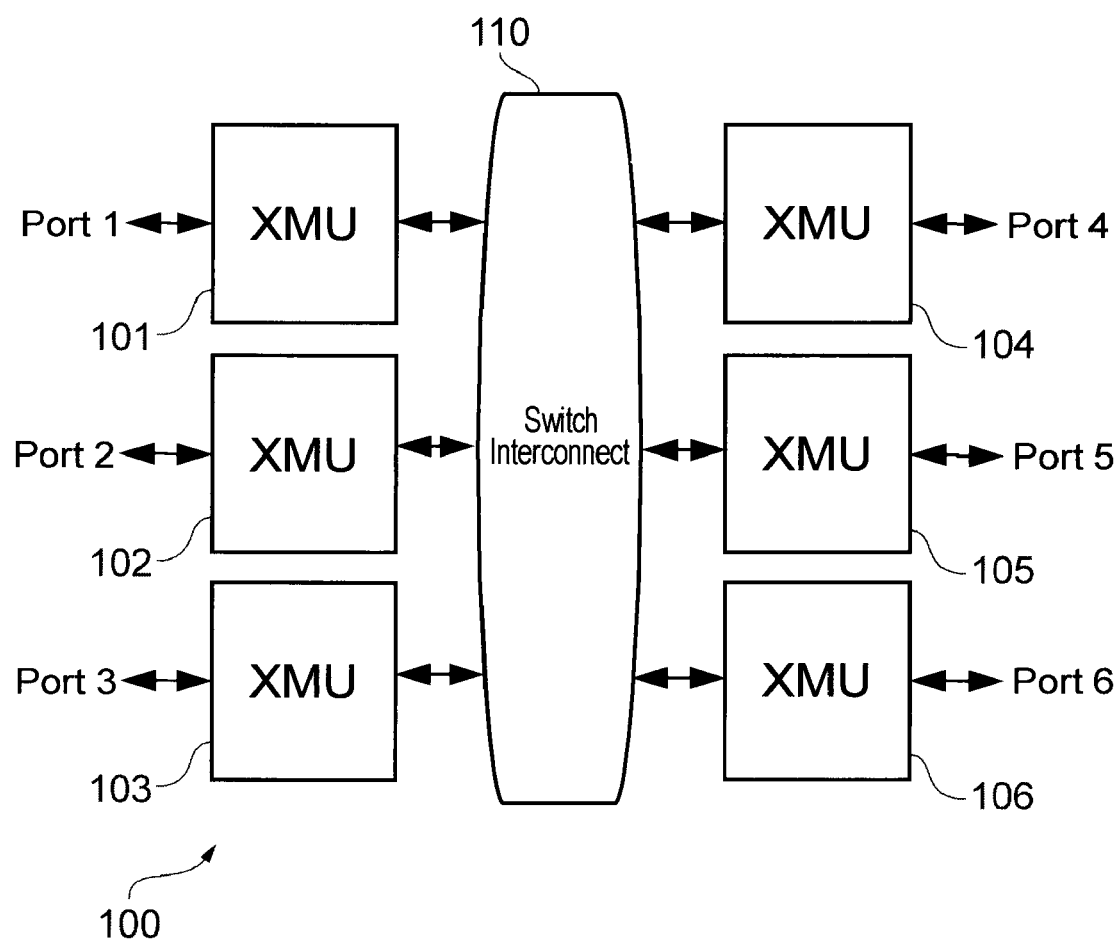
FIG. 33 is a schematic block diagram of an example 6 port switch matrix.

FIG. 33 is a schematic block diagram representing a 6 port Switch Matrix 100 as an illustrative example only. In this example, six XMUs 101-106 are instantiated and connected together by means of a switch interconnect 110. The switch interconnect could be implemented in the form of a fully connected point to point multiplexing structure. In this example, the switch interconnect 110 is operable to connect to treat XMUs 101, etc. as being synchronous and to meet timing (1 cycle) on all connections between XMUs.

Theoretically, the number of XMUs 101, etc. instantiated in one switch matrix is unlimited. However, practical implementations can determine how many XMUs are in any given design. It will be appreciated that is a practical implementation, many more than six XMUs will typically be implemented, the choice of six XMUs in FIG. 33 merely being for illustrative convenience.

Figure 34:
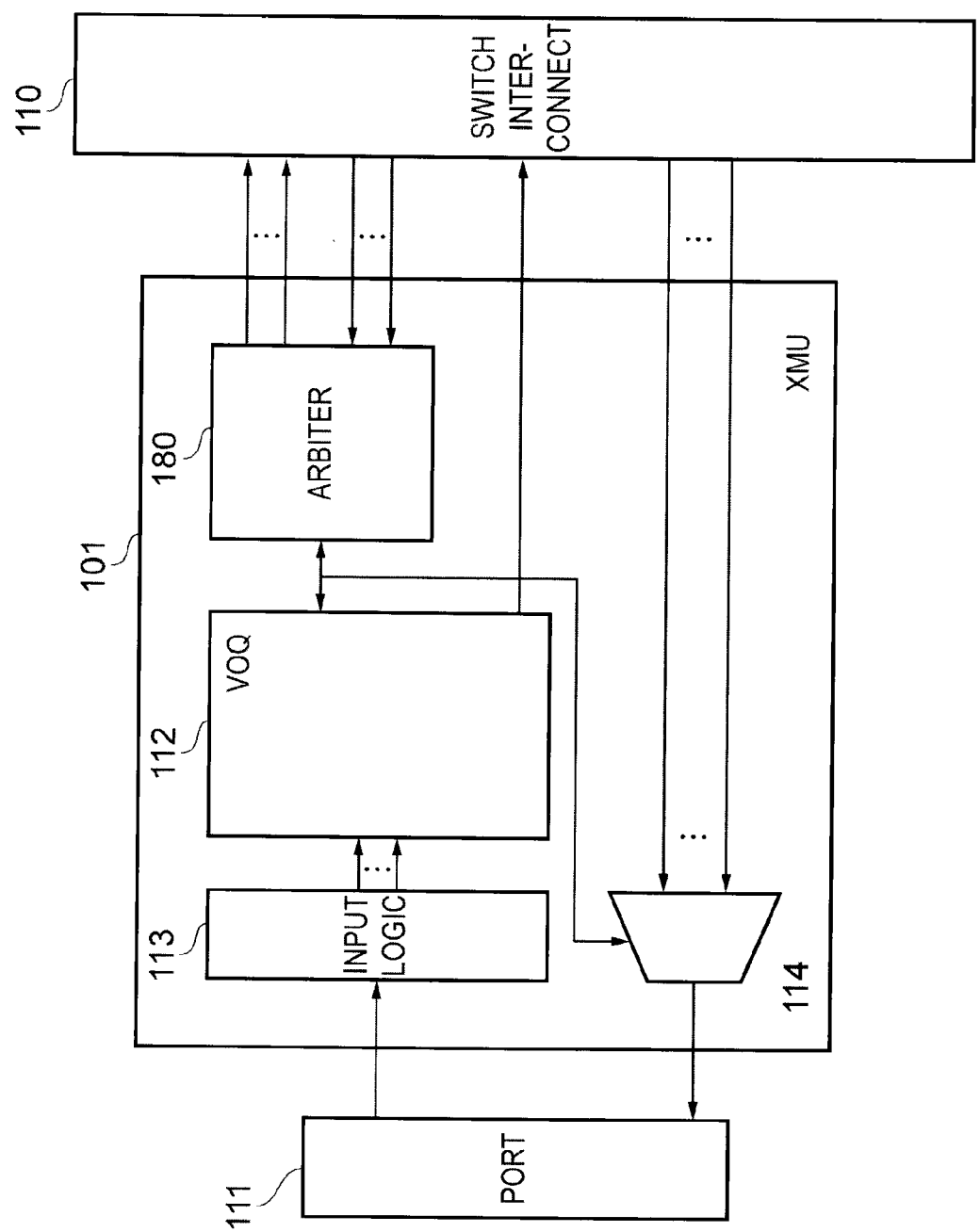
FIG. 34 is a schematic representation of a switch matrix unit of the switch matrix of FIG. 33.

FIG. 34 is a schematic representation of an example configuration of an XMU 101. The other XMUs 102-106 can be similarly configured. The XMU 101 is connected to receive packets from a port 111. The packets are allocated by input logic 113 to a Virtual Output Queue (VOQ) mechanism 112 that is used to buffer the packets received at the XMU 101.

The concept behind a VOQ mechanism is that packets are sorted into separate virtual queues based on their destination, as will be described in more detail hereinafter. In this way, packets bound to different destinations do not block each other. The input data packets are received as a raw stream of data with sideband control signals indicating start/stop, size and routing instructions for the packets. The input logic 113 of the VOQ mechanism uses the packet contents and the sideband control signals to sort the packets into the separate virtual queues.

Arbiter logic is operable to communicate via the switch interconnect 110 with corresponding arbiter logic of the other XMUs 102-106 to schedule the sending of the packets buffered in the VOQ mechanism 112 to appropriate output ports. The arbiter logic is coupled to the VOQ mechanism 112 and also to an output multiplexer 114, which receives packets from the switch interconnect 110 to be passed to the port 111, to schedule and control the operation of the VOQ mechanism 112 and the multiplexer 114.

Figure 35:
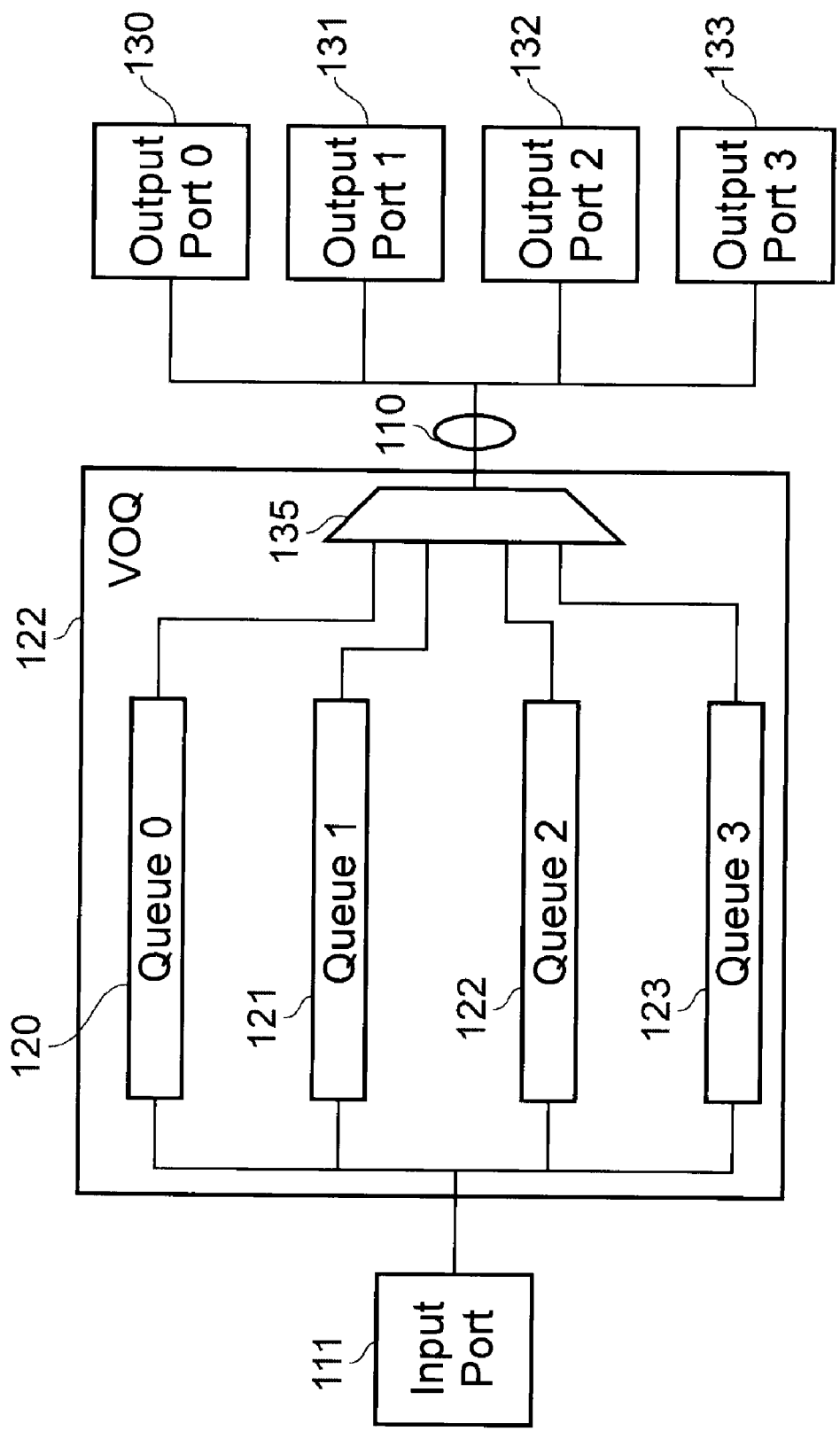
FIG. 35 is a schematic block diagram of an example virtual output queue of the switch matrix unit of FIG. 34.

FIG. 35 is a schematic representation of an example of a VOQ mechanism 112 for use in an XMU (say XMU 101). In the example shown in FIG. 35, all packets received, for example, from an input port 111 are placed in the virtual queue 120, 121, 122, 123 associated with their destination port 130, 131, 132, 133 (Packets destined for Port 0 (130) are placed in Virtual Queue 0 (120), etc). In this way, a stall on Port 0 (130) will not prevent packets in Virtual Queue 1 (121) from making progress to Port 1 (131) via the switch interconnect 110.

These Virtual Output Queues 120, 121, 122, 123 are not subject to independent flow control on the input to the XMU 101, etc. The queues exist as a single physical entity in the XMU 101, etc., and the separation into the separate queues is only a virtual separation, as represented by the gate 125.

The Virtual Output Queues form a first level of categorization for incoming packets. A further, second, level of categorization is in the form of packet categories. This second layer of categorization sits on top of the Virtual Output Queue mechanism. Packet Categories can be separately flow controlled on the input to the XMU 101, etc., using the sideband control signals. The number of Packet Categories can be a user defined value. It should be noted, that the XMU can also support a vanilla switch that contains no packet categories.

Figure 36:
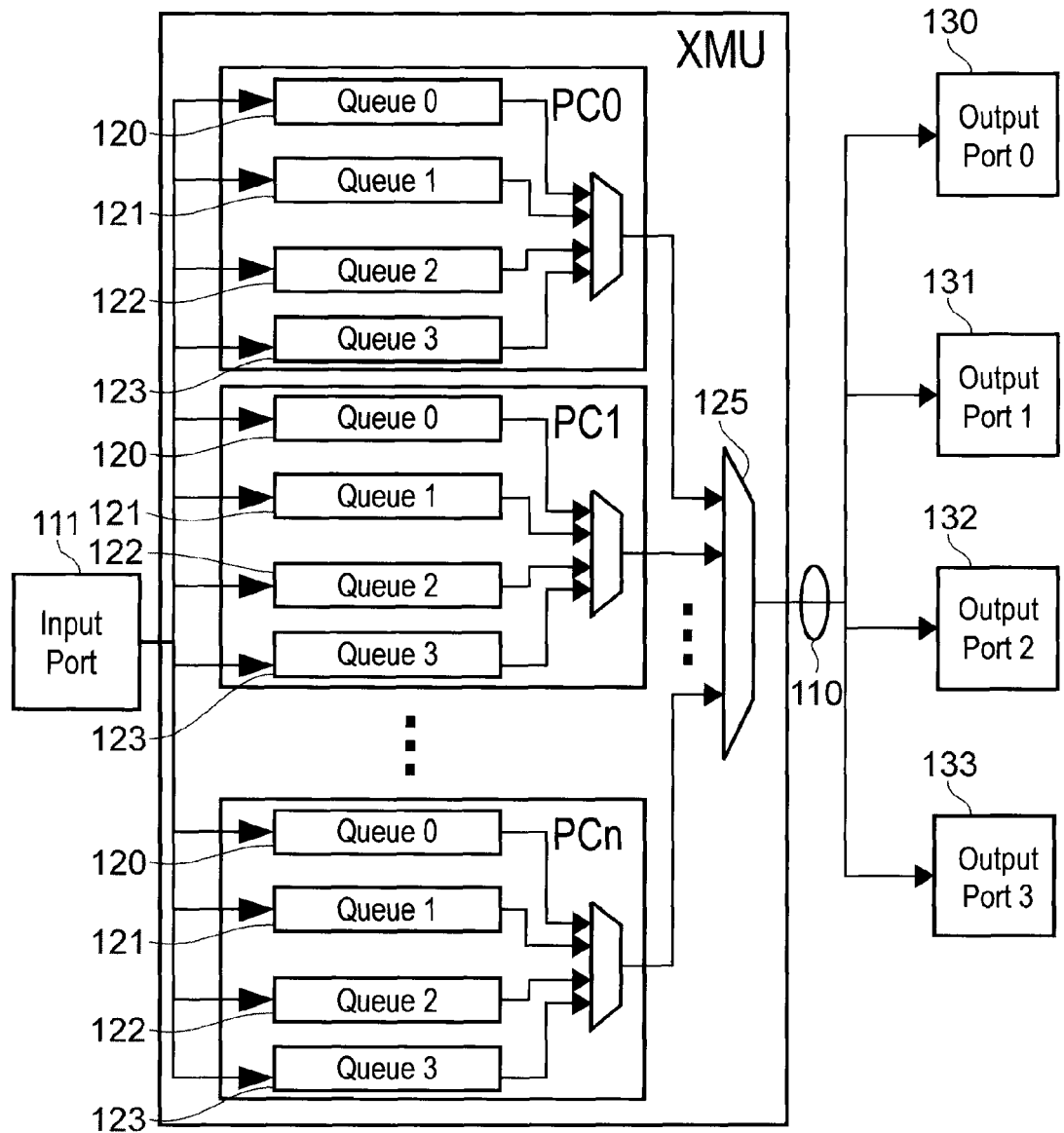
FIG. 36 is a schematic representation of an example organization for packet category storage in a virtual output queue.

FIG. 36 is a schematic representation of an example organization for Packet Category storage. As shown in FIG. 36, each Packet Category (PC0, PC1 . . . PCn) has its own independent Virtual Output Queue structure. In other words, each Packet Category has a number of independent virtual output queues equal to the number of destination ports in the Switch Matrix network. In the example shown in FIG. 36, there are four output ports 130, 131, 132, 133, and for each of the n Packet Categories, there are four virtual output queues 120, 121, 122, 123.

Accordingly, the total number (#) of queues in an example of an XMU is given by the formula below:

$$\#Queues = (\#of\ Destinations) * (\#of\ Packet\ Categories)$$

In an example embodiment, the amount of physical storage assigned to each Packet Category can be run-time configurable, for example using control and status registers (CSRs).

In order to support the Virtual Output Queuing mechanism described above, a buffer management scheme can be implemented. The example scheme used in the present example is a full scatter/gather algorithm which operates on a memory size of 128 bits. On ingress, individual flits (parts) of a packet will be "scattered" (physically) throughout the RAM. On egress, the read state machine will "gather" the flits back together to reconstruct the packet.

In the present example, the scatter/gather algorithm is implemented by maintaining several linked lists per Packet Category:

One Free List

One Packet List per Destination

The Free List contains the addresses of all of the unused buffer space and the Packet Lists contain the addresses of all of the packets currently in the buffer. Note that an address can only exist in one of the linked lists at a time.

Figure 37:
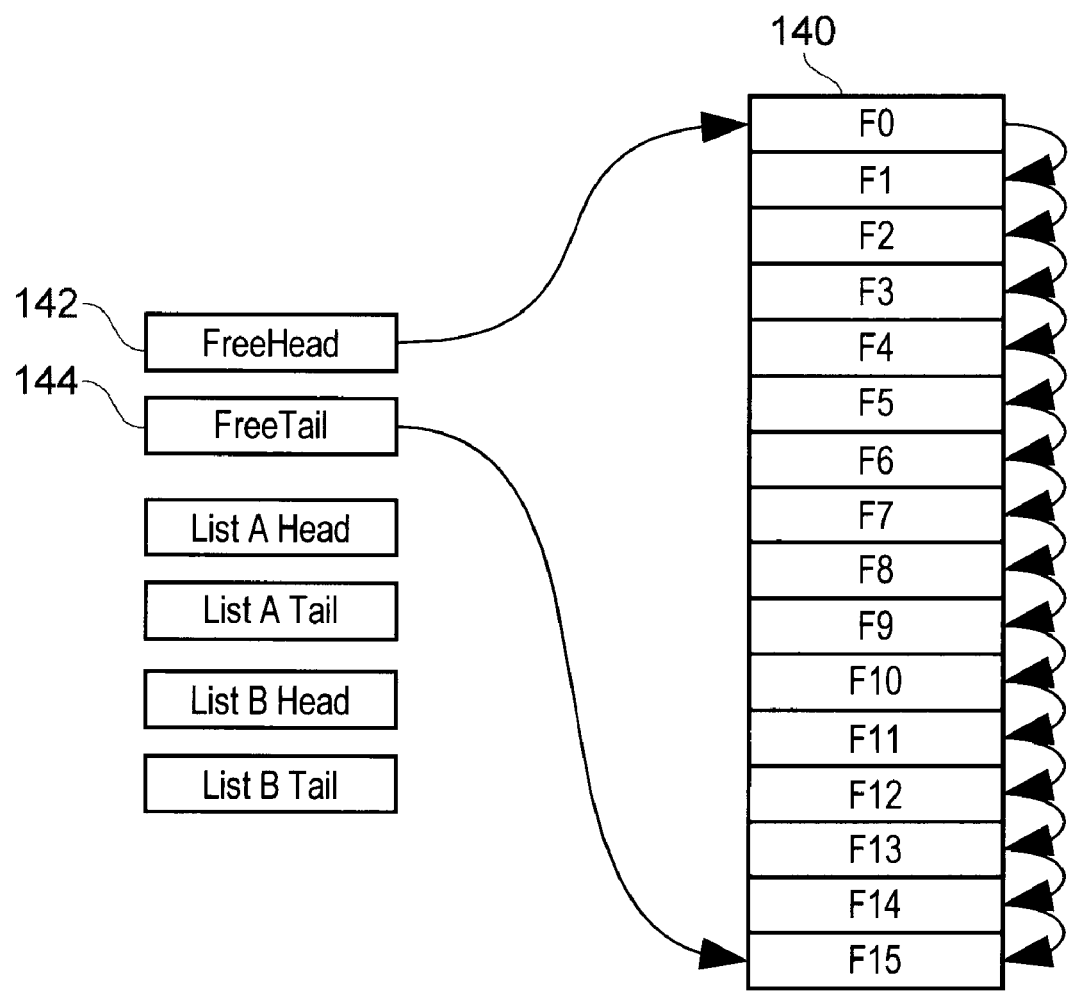
FIG. 37 is a schematic representation of a state following a reset.

FIG. 37 is a schematic representation of the state following a reset. In this state the buffers will all be empty, so the entire contents of the RAM will be contained in the free list and the packet lists will be empty. The free list 140 is ordered from "F0" to "F15", with a free head pointer 142 pointing to the head F0 of the free list 140 and the free tail pointer 144 pointing to the tail F15 of the free list 140.

When a packet arrives for the packet category in question, the linked lists will begin to change. The first flit of the packet will be written into the first entry contained in the free list 140 and so on. The free list 140 and the appropriate packet lists will then be updated to reflect the new state of the queue.

Figure 38:
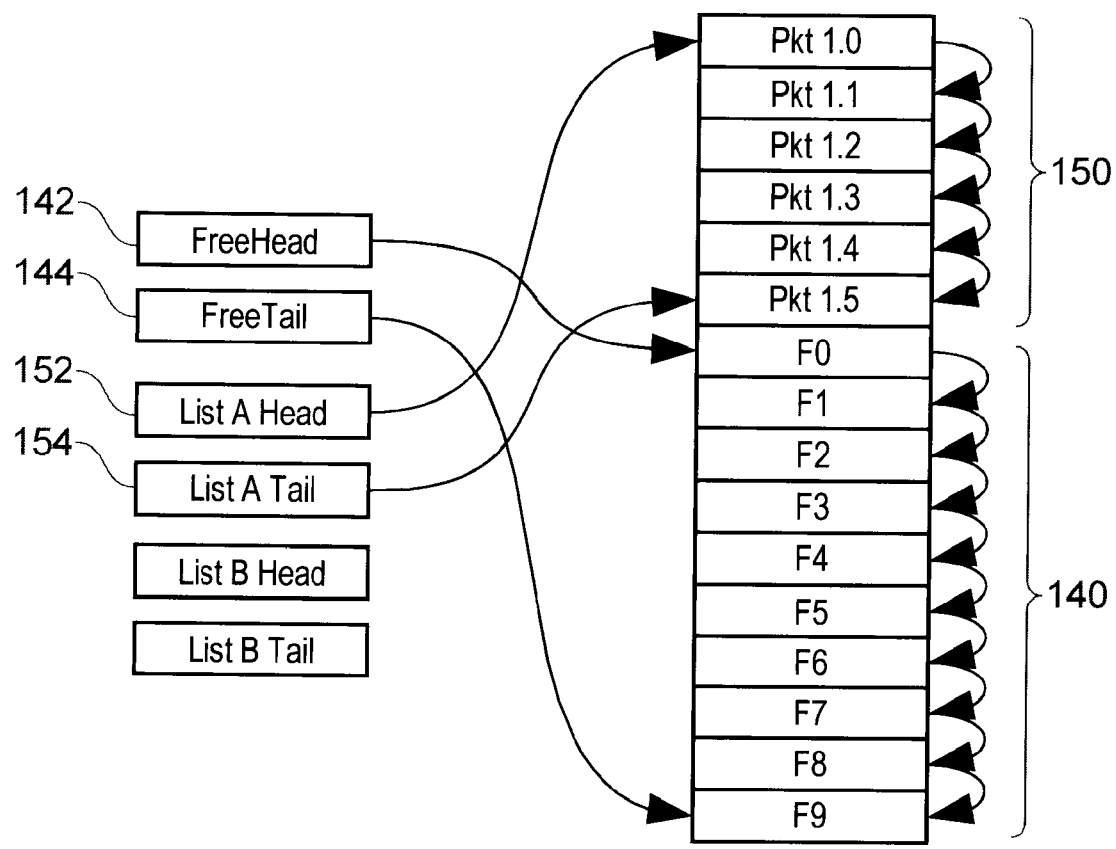
FIG. 38 is a schematic representation of an example of a state after one packet is received for a destination.

FIG. 38 is a schematic representation of an example of a state after one packet is received for Destination A. In this state, the free list 140 now only comprises entries F0-F9, with the free head pointer 142 pointing to the head F0 of the free list 140 and the free tail pointer 144 pointing to the tail F9 of the free list 140. The flits of the packet for destination A is then held in entries Pkt1.0 to Pkt1.5 with a List A head pointer 152 pointing to the head Pkt1.0 of the List A 150 packet and the List A tail pointer 154 pointing to the tail Pkt1.5 of the List A 150 packet.

Figure 39:
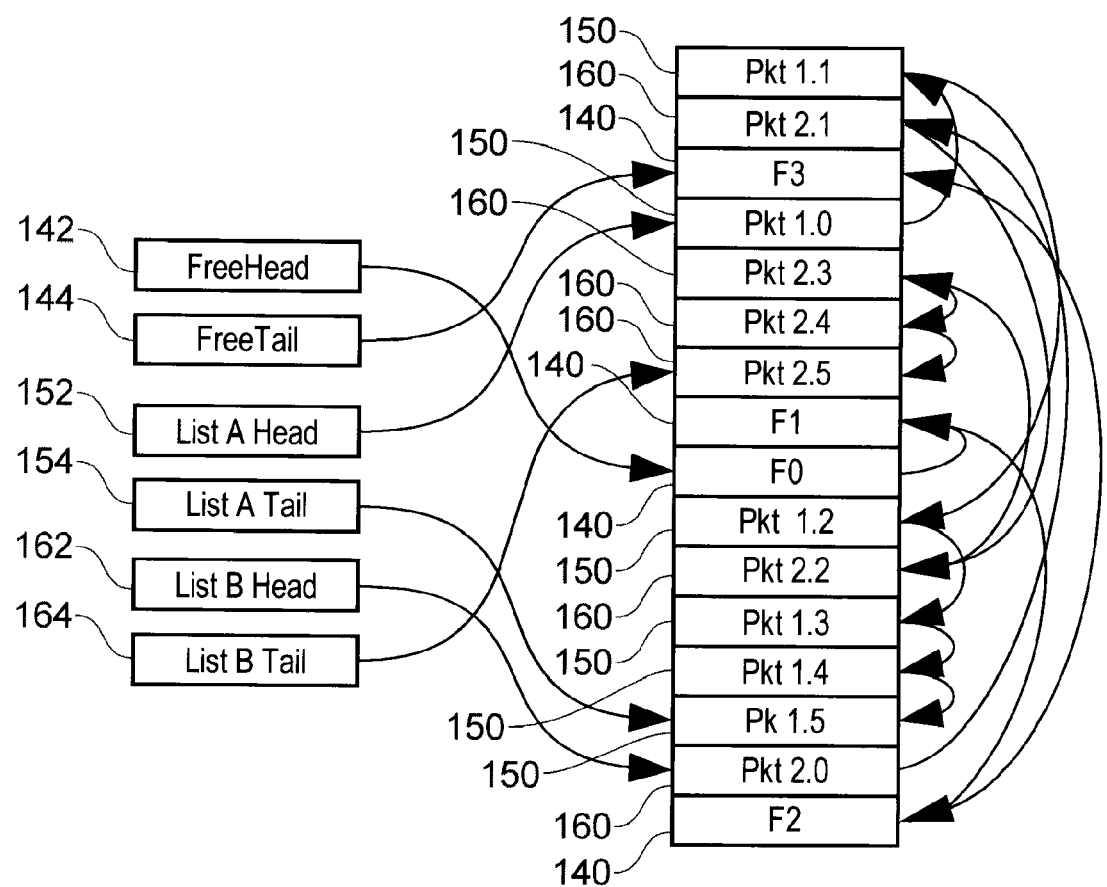
FIG. 39 is a schematic representation of an example of a state where packets for two lists are interspersed with free lists entries.

After some time the lists can start to appear fragmented. Entries containing packets and free space will be interspersed. The lists might look something like the representation of FIG. 39 where packets for lists A 150 and B 160 are interspersed with free lists 140 entries. As represented in FIG. 39, list A starts at the entry pointed to by List A head pointer 152 and then follows links within the entries to entry also pointed to by List A tail pointer 154. Also, list B starts at the entry pointed to by List B head pointer 162 and then follows links within the entries to entry also pointed to by List B tail pointer 164. Similarly the free list starts at the entry pointed to by the free head pointer 142 and then follows links within the entries to the entry also pointed to by the free tail pointer 144. As a result, individual packet flits are scattered throughout the RAM and the linked lists maintain the context.

Control of the linked lists is accomplished through two algorithms, one for packet reads (transmit), one for packet writes (receive). When a packet is received into the queue it is written into the unused portion of the buffer. On each cycle, the incoming flit is always written into the buffer entry indicated by the first entry in the free list. The free list and the appropriate packet list are then updated according to this algorithm:

1. If the packet list is empty then the head of the free list becomes the new head of the packet list.
2. If the packet list is not empty, then the head of the free list is added to the end of the packet list.
3. The next entry in the free list becomes the new head of the free list.

As a packet is transmitted, the buffer is cleared of that packet and the resulting free space is added to the free list. On each cycle, the outgoing flit is read from the buffer entry indicated by the first entry in the appropriate packet list. The free list and the appropriate packet list are then updated according to this algorithm:

1. If the free list is empty then the head of the packet list becomes the new head of the free list.
2. If the free list is not empty then the head of the packet list is added to the end of the free list.
3. The next entry in the packet list becomes the new head of the packet list.

In the present example, all packets transfers are aligned to 32 bit boundaries. If the data path width is 64 or 128 then this implies that packets can start and end in the same cycle. An alignment buffer can be used when writing the packet into the data buffer managed by the scatter/gather algorithm. With an alignment buffer is used, the first flit of packet can be written into the alignment buffer instead of to the regular buffer. The existence of this alignment buffer is hidden from the local port and is not included in the flow control reporting. In this way, the holes in the memory introduced by misaligned packets can be hidden.

In the interest of keeping latency as low as possible, the packet buffers can be designed to support a "cut through" mode (software configurable). In this mode, a packet can be eligible to be transmitted to the destination port before the entire contents of the packet is written into the input buffer.

To determine when a packet is eligible for transmission, the control logic can take into account the relative speed of the source and destination ports. Transmission of a packet does not start until a sufficient portion of the packet is present in the buffer to guarantee that the entire packet can be sent without stalling to wait for the packet to arrive from the input port.

If the input port is faster than the output port then the packet is eligible for transmission as soon as the first flit is received.

If the output port is fast than the input port, then an example formula for determining eligibility can be used as follows:

$$\text{flits\_in} = \text{pkt\_length} - \text{pkt\_length} * (\text{recv\_spd}/\text{xmit\_spd}).$$

"flits_in" is the total number of flits that must be present in the buffer before the packet is eligible for transmission.

"pkt_length" is the length of the packet in flits,

"recv_spd" is the speed of the receive port in number of flits per cycle.

"xmit_spd" is the speed of the transmit port in number of flits per cycle.

Optionally, a 'minimum arbitration latency' could also be factored into this formula.

It is to be noted that packets that are eventually determined to be bad might already be in flight to the destination device before the error is detected.

When "cut through" mode is turned off, a store and forward scheme can be implemented. With a store and forward scheme, a packet would not be considered eligible for arbitration and transmission until the entire contents of the packet have been placed into the input buffer and the source port has confirmed that the packet is valid.

The virtual output queue structure can help to prevent Head of Line (HoL) blocking between packet categories. Since all packet categories have separate flow control and buffering resources, no amount of congestion occurring on one packet category will affect any other packet category.

Figure 40:
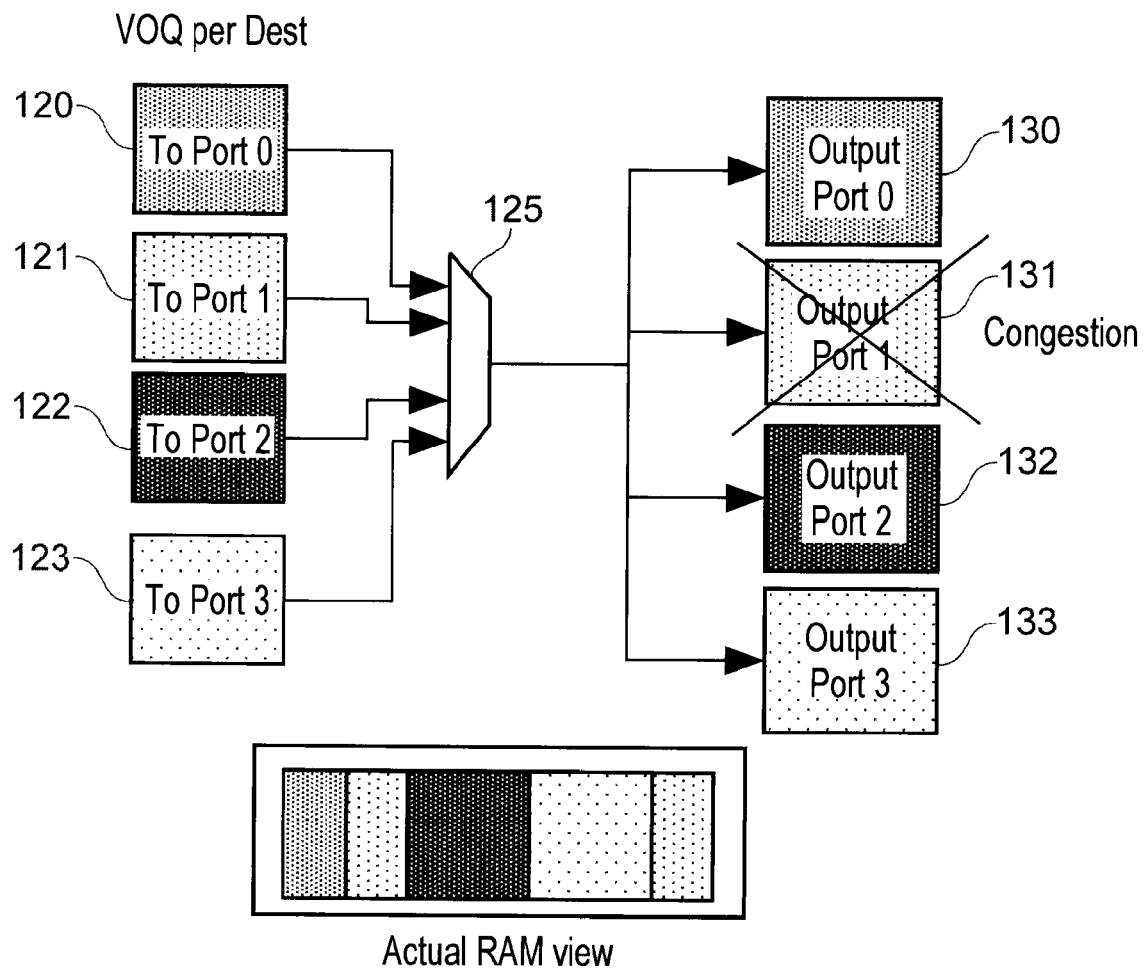
FIG. 40 is a schematic representation of congestion at a single port.

The virtual output queue structure can also help to alleviate HoL within a packet category inside an XMU. FIG. 40 shows that congestion at a single port (port 1) will not prevent the queues for other destinations from making progress.

Figure 41:
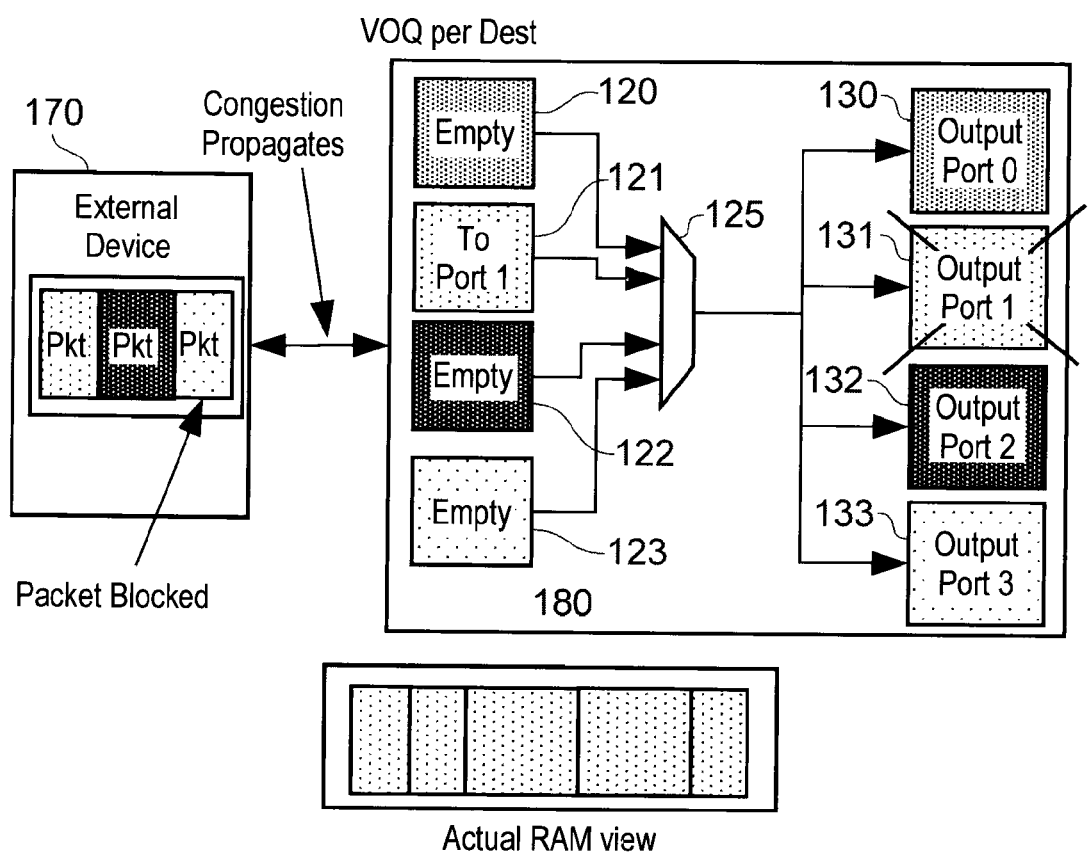
FIG. 41 is a schematic representation of the result of continued congestion.

If the congestion continues, however, the VOQ will not be able to prevent HoL problems completely within a packet category. Eventually, continued congestion will result in the entire queue for that Packet Category being filled with packets that are bound for the congested port. This problem is illustrated in FIG. 41. The buffer space allocated to this Packet Category is consumed entirely by packets bound for output port 1, which is congested. This congestion then propagates back to the external port 170. The external port 170 is now unable to send packets to destinations 0, 2 and 3, even though they are not congested.

Since it is not possible to entirely prevent this kind of head of line blocking in the XMU 121, etc., these conditions should be detected and removed to prevent them from affecting the network any more than necessary. To support this goal, the XMU 121, etc. has a number of built trigger conditions that can be used in HoL detection. These can be used to detect when forward progress has stopped within a Packet Category. The actual trigger conditions included can be configured by the user at compile time.

Once a HoL blocking condition is detected, an external entity 170 is responsible for controlling any recovery needed. To support this, the XMU 101, etc. includes hardware support 180 for flushing the contents of its queues. It can be programmed to flush a specified number of packets from any specified queue, or it can be programmed to flush an entire queue.

The XMU 121, etc. implements a distributed arbitration scheme. There is no central arbiter involved, instead each individual XMU 121, etc. implements input and output arbiters 182 and 184 (see FIG. 42). These arbiters collaborate to arrive at scheduling decisions.

The distributed scheme is implemented as a three phase process:
1. Advertise—input arbiters 182 advertise available packets to output arbiters 184.
2. Request—Output arbiters 184 request a packet from an input arbiter 182 and provide an indication of how busy they currently are.
3. Acknowledge—Input arbiters 182 acknowledge one packet request and begin transmitting the selected packet.

Figure 42:
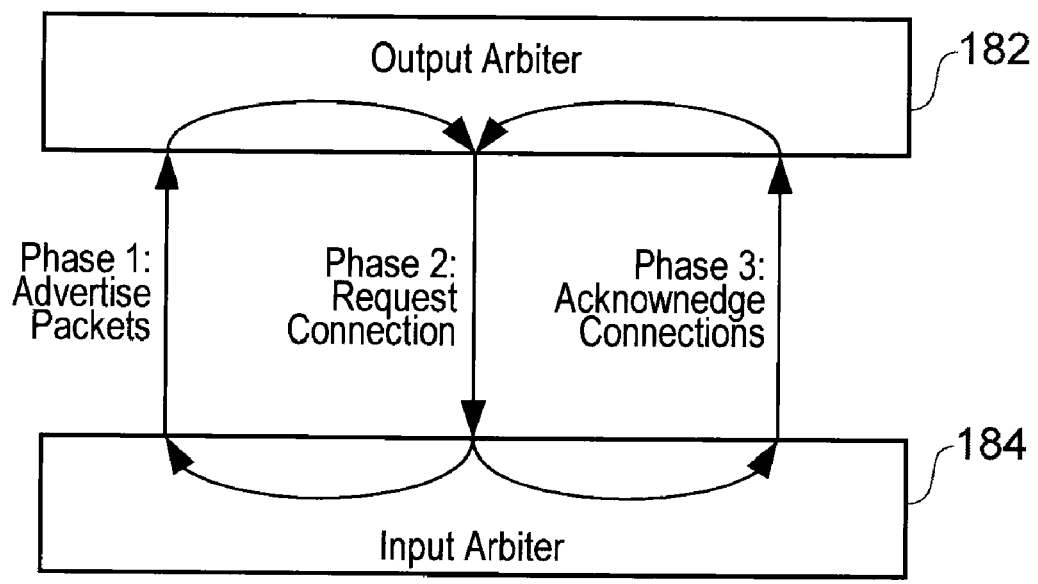
FIG. 42 is a schematic representation of where a maximal set of connections is reached.

This arbitration scheme is repeated every cycle in a pipelined fashion. In this way, the algorithm iterates over the scheduling problem. If a particular input arbiter 182 or output arbiter 184 failed to make a match during the previous iteration then it will continue to arbitrate on the following iterations. Decisions made on previous cycles are fed back into the arbitration algorithm and new connection matches are sought after. Eventually, a maximal set of connections will be reached. This is not an absolute maximal set, but rather a maximal set given all previous decisions (IOW, no backtracking is done). FIG. 42 illustrates this process visually.

In the advertise phase, each input arbiter (iarb) will notify each output arbiter (oarb) of any packets that it has received which are routed to that output arbiter. The iarb will send the following information to each oarb:
  Packet length—The length of the packet in bytes.
  Local destination port—If the XMU services more than one destination port then it is necessary to specify for which port the packet is intended.
  Packet category—The packet category with which the packet is associated.
  Weight—An adjustable value used by the iarb to indicate to the oarb what priority the packet in question should be considered.

The weight mechanism is the primary means of arbitration in this phase. Each iarb is assigned a pool of 'weight credit'. The iarb then assigns this weight credit to the packets in his queue. Assigning more weight to a particular packet increases the likelihood that the packet will be requested by the output arbiter. Factors that are taken into account in assigning weight credit to a packet include:
  Time in queue—How long has the packet been waiting?
  Number of packets in queue—The total weight will be shared amongst multiple packets.
  Congestion at the destination port—The oarb will be providing congestion information back to the iarb, if an iarb notices a congested port, then it can choose to lower the priority on packets to that port and focus on servicing other ports.

The iarb is designed such that the exact algorithm used in this phase is programmed by the user at compile time. The user can write his own verilog module to define this arbitration algorithm, or he can instantiate one of the predefined arbitration algorithms.

The maximum amount of weight credit an iarb can have can be configured at compile time. The actual amount of weight credit an iarb has can be configured at run-time through state registers (CSRs).

During this phase, the oarb will examine all of the packets, as advertised by all of the iarbs in phase 1, that are available to transmit on his local ports. The oarb will first check if the local port has the necessary credit for transmitting the packets. Any packets for which there is not necessary credit will be eliminated from arbitration. The oarb will then use the advertised weights of the remaining packets to determine which packet it would like to have transmitted. A single packet (per local destination port) is chosen, and a packet request is sent to the corresponding iarb.

Like the iarb, the oarb is also designed such that the exact algorithm used in this phase is programmed by the user at compile time. The user can write his own verilog module to define this arbitration algorithm, or he can instantiate one of the predefined arbitration algorithms.

It is during this final phase of arbitration that connections are made and packets start being transmitted. The iarb gathers all of the requests for transmit from all of the oarbs in the matrix. The iarb then must choose which request to acknowledge. The factors used to make this selection are:
  Time in queue.
  Congestion at destination port.

This arbitration algorithm can also defined by the user at compile time. The user can write his own verilog module to define this arbitration algorithm, or can instantiate one of a number of predefined arbitration algorithms.

Time division multiplexing (TDM) is a mechanism introduced to allow a pipeline to be run in various configurations without unnecessary duplication of logic. It is based around the idea that a single pipeline providing a set bandwidth, N, can be split into separate, independent, pipelines whose total bandwidth is still equal to N and all data processing logic can be shared by the individual pipelines. The pipeline can then be configured to work in the desired configuration within the current system.

TDM is implemented through the use of "TDM storage primitives" and the use of a system wide "phase" signal which will be described in subsequent sections.

Figure 43:
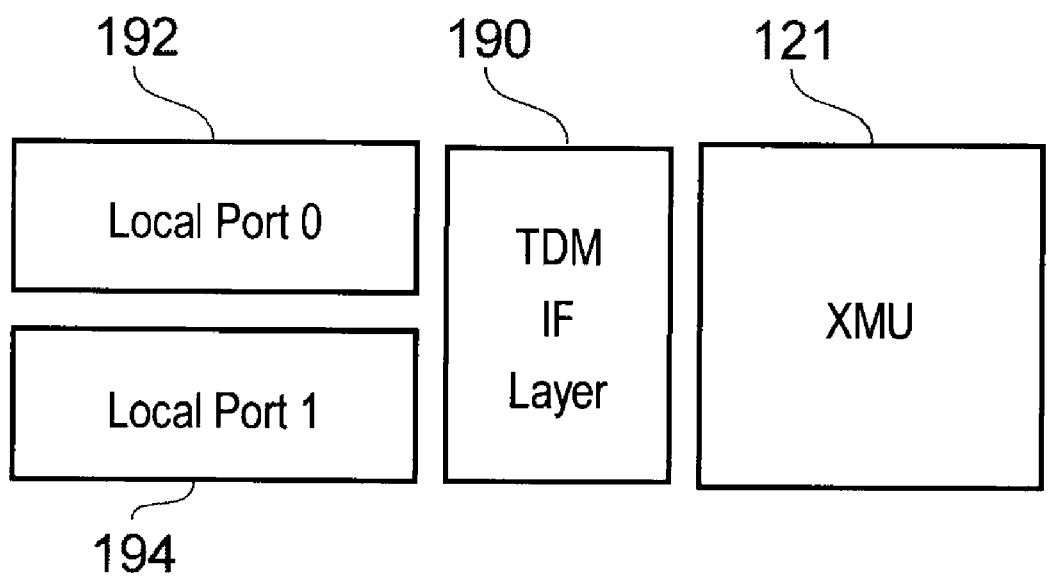
FIG. 43 is a schematic representation of an implementation of a TDM interface layer between local ports and a switch matrix unit.

TDM is an optional feature in the XMU that can be configured by the user at compile time. This allows a single XMU to service more than one local port in a TDM manner. A TDM interface layer is implemented between local ports 192 and 194 and an XMU 121 as shown in FIG. 43.

If TDM is enabled, then the number of local ports supported can also be configured. The configurations depend on the data path width being used. If the data path is configured to be 64 bits then the configurations are:
  One 64 bit device.
  Two 32 bit devices.

If the data path is configured to be 128 bits then the configurations are:
  One 128 bit device.
  Two 64 bit device.

Four 32 bit device.

One 64 bit device+two 32 bit device.

Furthermore, each of these devices can actually be run at slower speeds through the use of the phase enable signal (see below).

Figure 44:
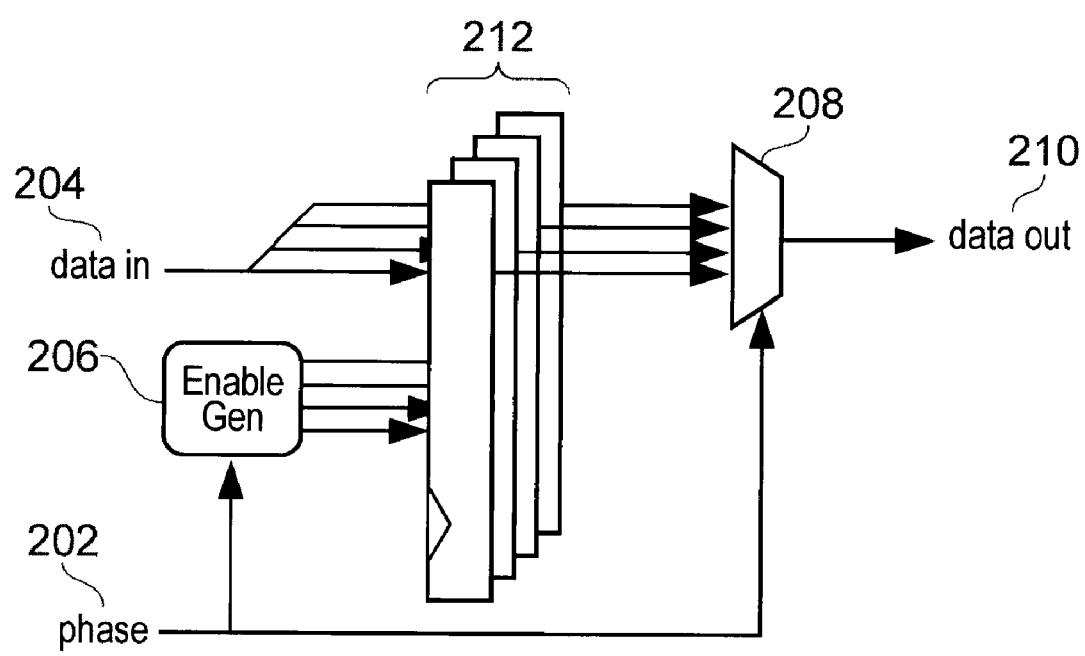
FIG. 44 is a schematic representation of a structure of a TDM storage primitive

A fundamental building block of an example TDM embodiment is the TDM storage primitive. The storage primitive consists of a duplicate register bit for each supported pipeline in the design. In one example, 4 register bits are provided per bit of storage needed. These four registers are then controlled by a phase signal. FIG. 44 shows an example structure of a TDM storage primitive 200. Illustrated in FIG. 44 are the four registers 212, which receive data in, and are selectively enables 206 in response to the phase signal 202. The data is selectively output 210 by a multiplexer 208, which also operates in response to the phase signal 202.

Thus, control of the TDM storage primitive 200 is implemented with the 'phase' signal 202. The phase signal 202 is a globally synchronous signal that indicates which core is active for the current clock cycle. The meaning of the phases is dependant on the configuration of the pipeline. Table 1 summarizes and example indication of which core is active based on the phase signal value and the core configuration.

TABLE 1

| Core | ACTIVE CORE | | | |
|---|---|---|---|---|
| | Phase | | | |
| Configuration | 0 | 1 | 2 | 3 |
| 1 × 128 | Core 0 | Core 0 | Core 0 | Core 0 |
| 2 × 64 | Core 0 | Core 1 | Core 0 | Core 1 |
| 4 × 32 | Core 0 | Core 1 | Core 2 | Core 3 |
| 1 × 64, 2 × 32 | Core 0 | Core 2 | Core 0 | Core 3 |

An additional bit of information is also carried with the phase signal. This is the 'phase enable' signal. Normally, this signal will always be on, indicating that the phase is active. If the signal is toggled off then it indicated that the phase is inactive. In this way a particular core can be run at a fraction of its configured speed. For example, a 32 bit device can be run in 8 bit mode by toggling its phase enable signal on only once every 4 cycles.

Figure 45:
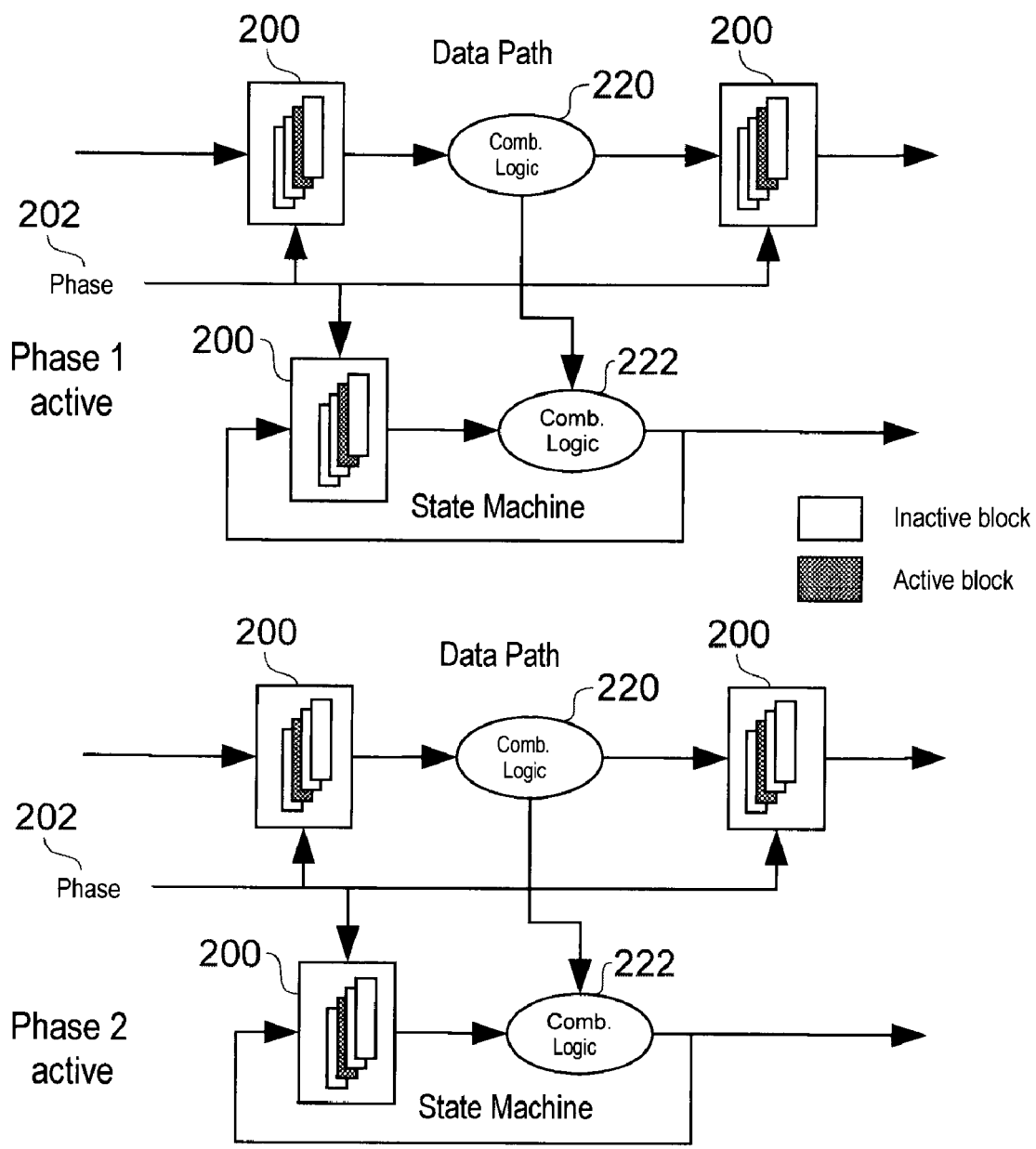
FIG. 45 is a schematic representation of the use of TDM primitives to allow sharing of logic between multiple independent pipelines.

FIG. 45 demonstrates an example of using TDM primitives in a system to allow sharing of logic between multiple independent pipelines.

This example shows how both data path 220 and state machines 222 can be implemented with TDM primitives 200. In this example, the combination logic is used and is active on each cycle. However, the storage elements are only active on those cycles on which the phase signal indicates that it is their active phase.

Figure 46:
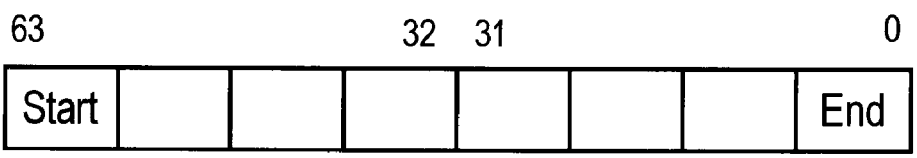
FIG. 46 is a schematic representation of a 64 bit data path.

In this example Big Endian ordering is assumed on all data buses. The first byte in a packet is always contained in the highest position on the data bus with the rest of the packet following it. FIG. 46 illustrates this visually for a 64 bit data path.

The switch matrix can be used in a number of different configurations. Configuration possibilities can include one or more of the following:

Number of XMU blocks—Determines the number of XMUs instantiated in the complete switch matrix. In a non-TDM environment, on XMU equals one local port. Configuring an XMU as a TDM device allows that XMU to be shared amongst multiple ports (up to 4).

TDM ports per switch matrix—Each switch matrix can be configured to support full TDM with 1-4 ports connected, half TDM with 1-2 ports connected or TDM disabled allowing only a single port to be connected. In a TDM configured switch matrix, separate buffering resources are allocated to each TDM port.

Packet categories—Many protocols provide for various ways of categorizing packets in order to provide separation and differentiation of traffic. This configuration parameter allows each switch matrix to be configured to support any number of packet categories. Each category of packet can have its own buffering resources allocated to it. For example, this feature can support virtual lanes in InfiniBand or virtual channels and/or various packet types (Posted/Non-Posted/Completions) in PCI-Express.

Ordering Rules—Some protocols, like PCI Express, enforce a set of ordering rules on packets of different categories. The XMU will be designed such that these ordering rules are encapsulated in a way that can be easily modified.

Buffer sizes—The total amount of buffering present in a given switch matrix is set first, then it is broken down into min/max buffer space for each port and packet category. The actual amount of space allocated to any given port/packet category can be set with configuration status registers (CSRs).

Multiple read ports—Each input buffer can be configured to have multiple read ports. The switch interconnect can support multiple routing paths out of each XMU. In one example, up to 2 Read Ports can be supported per XMU. This feature is useful for congestion management.

Available contexts—The total number of packets that the switch matrix can maintain at any given time can be specified on a per port per traffic category basis. This can also be specified as 'infinite'. This means that an XMU will always accept new packets as long as there is data credit available for the packet. This feature may, for example, not be needed in PCI Express but could be used, for example in InfiniBand, which has only data credits (no header credits).

Credits per context—Some protocols (PCI Express) maintain separate credit for both header and data. The XMU however, can store the entire contents of the packet in the same buffer. To support header credit, the XMU can be configured to reserve sufficient data credit to support the number of contexts that it is advertising as available. This configuration parameter specifies how much space is to be reserved for this purpose (per context). For a PCIE device this should be set to 16 bytes (largest header). For InfiniBand, this would be set to 0.

Maximum Transfer Unit (MTU)—The switch matrix is intended to support packets up to 8 k bytes in size. It may be useful to specify a smaller supported packet size. The switch matrix can also be configured to support larger packet sizes.

Arbitration Priority/Algorithm—The switch matrix can implement two types of arbitration. It can perform packet category arbitration and can perform port arbitration. These arbiter blocks can be written in a modular way.

HoL triggers—Several HoL/congested related trigger mechanisms can be available. One example is a simple timeout value indicating the number of cycles that a packet can be present in the XMU before it is considered to be blocked.

Priority levels—Within each packet category optionally a priority level can be set that can be used by the routing algorithm.

Fixed packet length and cell interleaving can optionally be used to reduce the complexity of routing in large switches. With this feature the packets sent to the XMU can be of a fixed size. If a supported protocol does not enforce a fixed size the local port can be operable to implement the required segmentation and reassembly.

Accordingly, there has been described, a switch system comprises a switch matrix providing a configurable, protocol agnostic, packet switching core, the switch matrix providing a non-blocking switch connecting a configurable number of ports together.

Although the embodiments above have been described in considerable detail, numerous variations and modifications will become apparent to those skilled in the art once the above disclosure is fully appreciated.

What is claimed is:

1. A switch system for connecting a configurable number of ports together, the switch system comprising:
    a switch matrix including a configurable, protocol agnostic, packet switching core, the switch matrix providing a non-blocking switch connecting together the configurable number of ports;
    wherein the switch system is configured so that received packets are separated in packet categories, wherein each packet category is separately flow controlled, wherein the switch system includes a buffer for each packet category, and wherein each packet is stored in the buffer for the packet category for the packet by storing the packet in parts of a predetermined size; and
    wherein storing the packet in the buffer involves distributing the parts of the packet in a scattered pattern throughout a random-access memory (RAM) in which the buffer is located in accordance with a pattern determined using a scatter/gather algorithm.

2. The switch system of claim 1, comprising a plurality of switch matrix units and a switch interconnect interconnecting the switch matrix units, at least one said switch matrix unit providing a port connection to a port and providing a plurality of virtual output queues for respective destination ports, each virtual output queue being configured to buffer received packets to be transmitted to a respective destination port.

3. The system of claim 2, wherein the switch matrix unit comprises at least one virtual output queue per destination port.

4. The system of claim 3, wherein said at least one switch matrix unit comprises a plurality of virtual output queues for respective packet categories per destination port.

5. The system of claim 2, wherein said at least one switch matrix unit is operable to receive data packets as a raw stream of data with sideband control signals indicating start/stop, size and routing instructions for the data packets.

6. The system of claim 2, wherein said at least one switch matrix unit is operable to allocate received data packets to the virtual output queues according to sideband control signals indicating routing instructions for the data packets.

7. The system of claim 2, wherein said at least one switch matrix unit is operable to transmit a data packet to a destination output port on completion of scheduling for transmission to the destination output port.

8. The system of claim 2, wherein said at least one switch matrix is operable to schedule buffered data packets for transmission using a distributed, iterative routing mechanism.

9. The system of claim 2, having a data path of configurable width.

10. The system of claim 2, wherein said at least one switch matrix unit is configured to operate in a time division multiplex mode in which each switch matrix unit is configured to implement multiple ports simultaneously.

11. The system of claim 10, having a data path width comprises a number of bytes divisible by a number ports supported.

12. The system of claim 2, wherein said at least one switch matrix unit comprises an alignment buffer into which a first flit of a received data packet is written.

13. The switch system of claim 1, wherein the switch system is configured to maintain, for each packet category:
    a free list that includes addresses of unused buffer spaces; and
    a packet list that includes addresses of all parts of received packets that are stored in the buffer.

14. A method of connecting a configurable number of ports together, comprising:
    providing a switch system comprising a switch matrix including a configurable, protocol agnostic, packet switching core; and
    operating the switch matrix to provide a non-blocking switch connecting together the configurable number of ports, wherein operating the switch matrix comprises: and
        separating received packets into packet categories, wherein each packet category is separately flow-controlled; and
        storing each packet in a buffer for the packet category in the switch in parts of a predetermined size, wherein storing the packet in the buffer involves distributing the parts of the packet in a scattered pattern throughout a random-access memory (RAM) in which the buffer is located in accordance with a pattern determined using a scatter/gather algorithm.

15. The method of claim 14 comprising:
    providing a plurality of switch matrix units and a switch interconnect interconnecting the switch matrix units;
    providing port connections to the ports via respective switch matrix units;
    buffering packets from the ports to be transmitted to destination ports in respective virtual output queues in the switch matrix unit, each virtual output queue being configured to buffer received packets to be transmitted to a respective destination port.

16. The method of claim 15, comprising receiving input data packets of as a raw stream of data with sideband control signals indicating start/stop, size and routing instructions for the packets.

17. The method of claim 15, comprising scheduling buffered data packets for transmission using a distributed, iterative routing mechanism.

18. The method of claim 17, comprising transmitting a data packet to a destination output port on completion of scheduling.

19. The switch matrix of claim 15, comprising providing a data path of configurable width.

20. The method of claim 15, comprising providing a plurality of switch matrix units and a switch interconnect interconnecting the switch matrix units, connecting at least one said switch matrix unit to a port and providing a plurality of virtual output queues, and buffering received packets to be transmitted to destination ports in the virtual output queues allocated to respective destination ports.

* * * * *